(12) United States Patent
Mohri et al.

(10) Patent No.: US 7,398,197 B1
(45) Date of Patent: *Jul. 8, 2008

(54) SYSTEMS AND METHODS FOR GENERATING WEIGHTED FINITE-STATE AUTOMATA REPRESENTING GRAMMARS

(75) Inventors: Mehryar Mohri, New York, NY (US); Mark-Jan Nederhof, Groningen (NL)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/566,945

(22) Filed: Dec. 5, 2006

Related U.S. Application Data

(63) Continuation of application No. 10/199,220, filed on Jul. 18, 2002, now Pat. No. 7,181,386.

(60) Provisional application No. 60/344,792, filed on Jan. 7, 2002.

(51) Int. Cl.
G05D 1/00 (2006.01)
G05D 3/00 (2006.01)
G06F 7/00 (2006.01)
G06F 17/00 (2006.01)

(52) U.S. Cl. .......................................... 704/1
(58) Field of Classification Search .................. None
See application file for complete search history.

(56) References Cited

U.S. PATENT DOCUMENTS

| | | | |
|---|---|---|---|
| 5,625,554 | A | 4/1997 | Cutting et al. |
| 5,649,215 | A | 7/1997 | Itoh |
| 5,719,997 | A | 2/1998 | Brown et al. |
| 5,721,939 | A | 2/1998 | Kaplan |
| 6,032,111 | A | 2/2000 | Mohri |
| 6,243,679 | B1 | 6/2001 | Mohri et al. |
| 6,587,844 | B1 | 7/2003 | Mohri |
| 6,944,588 | B2 | 9/2005 | Kempe |
| 2003/0009331 | A1 | 1/2003 | Schalkwyk et al. |
| 2003/0074184 | A1 | 4/2003 | Hayosh et al. |
| 2003/0120480 | A1 | 6/2003 | Mohri et al. |

(Continued)

OTHER PUBLICATIONS

Mohri et al., "Dynamic Compilation of Weighted Context-Free Grammars," Proceedings of ACL '98, Montreal, Quebec, Canada, pp. 891-897.

(Continued)

*Primary Examiner*—David Hudspeth
*Assistant Examiner*—Eunice Ng

(57) ABSTRACT

A context-free grammar can be represented by a weighted finite-state transducer. This representation can be used to efficiently compile that grammar into a weighted finite-state automaton that accepts the strings allowed by the grammar with the corresponding weights. The rules of a context-free grammar are input. A finite-state automaton is generated from the input rules. Strongly connected components of the finite-state automaton are identified. An automaton is generated for each strongly connected component. A topology that defines a number of states, and that uses active ones of the non-terminal symbols of the context-free grammar as the labels between those states, is defined. The topology is expanded by replacing a transition, and its beginning and end states, with the automaton that includes, as a state, the symbol used as the label on that transition. The topology can be fully expanded or dynamically expanded as required to recognize a particular input string.

21 Claims, 23 Drawing Sheets

U.S. PATENT DOCUMENTS

2004/0176945 A1    9/2004    Inagaki et al.

OTHER PUBLICATIONS

Cortes et al., "Context-Free Recognition with Weighted Automata," Jan. 2000, Kluwar Academic Publishers, vol. 3, No. 2-3, pp. 133-150.

Roche, Emmanual, Factorization of Finite-State Transducers, Mitsubishi Electrical Research Laboratories, TR-95-2, Version 1.0, Feb. 1995, pp. 1-13.

Roche et al., Introduction, Finite-State Language Processing, MIT Press, Cambridge, MA, USA, pp. 1-66, Jun. 1997.

Lauri Karttunen, "Finite-State Lexicon Compiler", Xerox Palo Alto Research Center, Apr. 1993.

Mohri et al., "Regular approximation of context-free grammars through transformation", Robustness in Language and Speech Technology, Kluwer Academic Press, 2000, pp. 251-261.

Nederhof, M., "Context-free parsing through regular approximation", Proceedings of the National Workshop on Finite State Methods in Natural Lanuage Processing, 1997, pp. 13-24.

Nederhof, M. "Regular approximations of CFLs: A grammatical view", Proceedings of the National Workshop on Parsing Technologies, 1997, pp. 159-170.

Nederhof, M. "Practical experiments with regular approximation of context-free languages," Association for Computational Linguistics, vol. 26, No. 1, 2000.

Knight et al., "A Primer on Finite-State Software for Natural Language Processing", Aug. 1999, ten pages.

Mohri M et al., "Weighted finite-state transducers in speech recognition," Computer Speech and Language, Jan. 2002, pp. 69-88, vol. 16, No. 1. XP004418697. Elsevier, London. GB.

*T -> ZY cost: 1*
*T -> c  cost: 2*
*Z -> TXY cost: 3*
*X -> aY cost: 4*
*Y -> bX cost: 5*
*Y -> c  cost: 6*

SYSTEMS AND METHODS FOR GENERATING WEIGHTED FINITE-STATE AUTOMATA REPRESENTING GRAMMARS

This non-provisional application is a continuation of U.S. patent application Ser. No. 10/199,220, filed Jul. 18, 2002, which claims the benefit of U.S. Provisional Application No. 60/344,792, filed Jan. 7, 2002, which is incorporated herein by reference in its entirety.

BACKGROUND OF THE INVENTION

1. Field of Invention

This invention is directed to the systems and methods for constructing weighted finite-state automata used to represent grammars.

2. Description of Related Art

Context-free and context-dependent grammars are used in a variety of technical fields, such as linguistics, speech recognition and speech synthesis (text-to-speech), to represent the conversion of one set of symbols into another set of symbols. For example, in context-dependent linguistic rewrite rules, the grammar defines how elements of a language can be combined based on the context in which those elements appear. Similarly, context-free grammars can be used to convert acoustic signals into recognized speech.

Grammars generally comprise a large number of rules, where each rule defines how a given string of symbols can be produced from a different series of symbols. In many computer-implementations, such grammars are represented or implemented using finite-state automata. If the grammar is a weighted grammar, the weighted grammar is represented as a finite-state transducer. Representing grammars using finite-state automata or transducers is often crucial, as finite-state automata or transducers can be optimized by compacting, or determinizing and minimizing, the finite-state automata or transducers.

SUMMARY OF THE INVENTION

Generating a finite-state automaton or transducer from a given context-free grammar is not necessarily a trivial exercise, especially given the large number of grammar rules necessary to implement a speech recognition system or a speech synthesis system. While generalized techniques for creating a finite-state automaton or transducer from the rules of a context-dependent grammar have been described, for example in U.S. Pat. No. 5,806,032, there are no such generalized techniques for creating a finite-state automaton or transducer from a finite-state transducer that represents the rules of a context-free grammar.

This invention provides systems and methods that generate, from a context-free grammar, a finite-state automaton or transducer that represents that context-free grammar.

This invention further provides systems and methods that generate, from a weighted context-free grammar, a weighted finite-state transducer that represents that context-free grammar.

This invention separately provides systems and methods that generate, from a finite-state automaton or transducer that represents a context-free grammar, a delayed acceptor that recognizes the strings described by that context-free grammar.

This invention further provides systems and methods that generate, from a weighted finite-state transducer that represents a context-free grammar, a delayed weighted acceptor that recognizes the strings described by that context-free grammar.

This invention separately provides systems and methods that compile a finite-state automaton or transducer that represents a context-free grammar into a delayed acceptor that recognizes the strings described by that context-free grammar.

This invention further provides systems and methods that compile a weighted finite-state transducer that represents a context-free grammar into a delayed weighted acceptor that recognizes the strings described by that context-free grammar.

This invention separately provides systems and methods that allow the delayed acceptor to be dynamically defined and/or modified without requiring recompilation.

This invention separately provides systems and methods that allow a delayed weighted acceptor to be dynamically expanded as it is used to recognize an input string.

This invention separately provides systems and methods that generate a dependency graph from the rules of a context-free grammar.

This invention separately provides systems and methods that determine the strongly connected components of a dependency graph representing a context-free grammar.

This invention separately provides systems and methods that construct an automaton from identified strongly connected components of a dependency graph representing a context-free grammar.

This invention separately provides systems and methods that allow a simple automaton that accepts a set of active non-terminal symbols of a context-free grammar, and that replace the transitions of the simple automaton with corresponding automata constructed from identified strongly connected components of a dependency graph representing that context-free grammar.

This invention further provides systems and methods that dynamically replace selected transitions of the simple automaton with corresponding ones of the automata constructed from identified strongly connected components of a dependency graph representing that context-free grammar based on input symbols of the grammar.

In various exemplary embodiments, the systems and methods according to this invention input the rules of a context-free grammar. In various exemplary embodiments, the rules are input using a specific format that specifies, for each rule, the left-hand non-terminal symbol, any right-hand non-terminal symbol(s) and any terminal symbol(s), and, if the context-free grammar is weighted, the weight of that rule. A dependency graph is then generated from the input rules, and the strongly connected components of the dependency graph are identified. Based on the identified strongly connected components, an automaton is generated for each strongly connected component.

In various exemplary embodiments, an automaton or topology that defines a number of states, and that uses a set of active ones of the non-terminal symbols of the context-free grammar as the labels between those states of that automaton or topology, is defined. In various exemplary embodiments where the defined automaton or topology is to be fully expanded, each transition, and its beginning and end states, are replaced with the automaton that represents the symbol used as the label on that transition. If, after all of the original transitions of the automaton or topology are replaced, any of the transitions of the expanded automaton or topology are labeled with a non-terminal symbol of the grammar, each such transition, and its beginning and ending states, are replaced with the automaton that represents the symbol used as the label on that transition. This continues until no transitions that are labeled with a non-terminal symbol of the context-free grammar remain in the expanded automaton or topology.

In various other exemplary embodiments where the defined automaton or topology is to be expanded dynamically, i.e., on-the-fly, terminal symbols of the context-free grammar are input. Each symbol of the string is selected in turn. If the selected symbol, given the current active state of the dynamically expanded automaton or topology, requires a transition labeled with a non-terminal symbol of the context-free grammar to be traversed, that transition, and its beginning and end states, are replaced with the automaton that represents the symbol used as the label on that transition. This continues until the last symbol of the input string is selected.

In various exemplary embodiments, the defined automaton or topology can by changed at any time without any need to redetermine the automata generated for the identified strongly connected components of the context-free grammar. Thus, the defined automaton or topology can be changed dynamically as a given input string of symbols of the grammar is being recognized.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF PREFERRED EMBODIMENTS

Figures 1, 2:
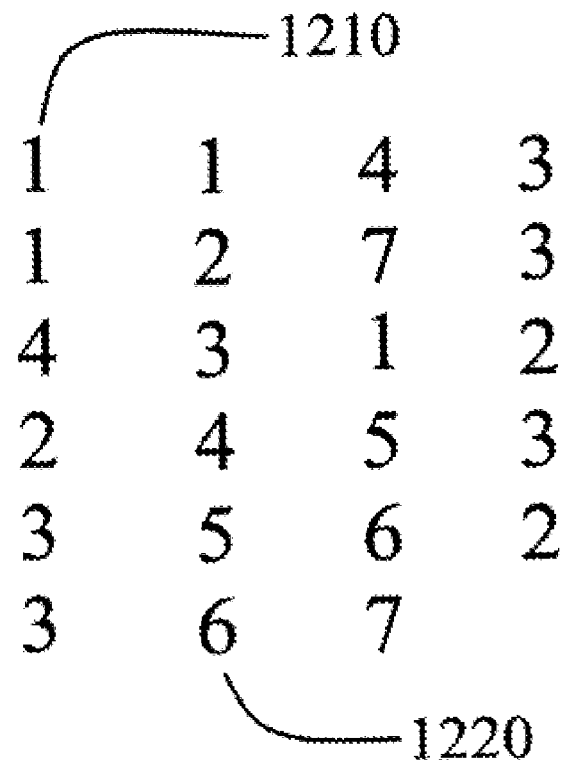
FIG. 1 illustrates one exemplary embodiment of a grammar G.
FIG. 2 illustrates one exemplary embodiment of a format usable to input a grammar into a grammar-finite-state transducer conversion system that converts the grammar G into a weighted finite state transducer according to this invention.

The systems and methods according to this invention generate a finite-state automaton from an input or received context-free grammar. A grammar, for the purpose of this invention, is a set of rules for transforming an input string of data into an output string of data, such as the transformation of voice into text or the transformation of a text in a first language into a text in a second language. FIG. 1 illustrates one example of a grammar G. The grammar G is context-free. The grammar G is also a weighted grammar, as opposed to being a non-weighted grammar. A weighted grammar is one which has costs assigned to each rule. This allows the system implementing the grammar to have multiple rules with different outputs for the same input. Each output is assigned a different weight and subsequent rules can modify these weights before an output decision is made.

The symbols in the grammar, for the purpose of this invention, are assigned specific definitions. Symbols that appear only in the right-hand side of a rule are called "terminal" symbols, and are represented using lower case symbols in the grammar G shown in FIG. 1. The other symbols in the grammar, which are the only symbols allowed to appear in the left-hand side of a rule and possibly appear in the right-hand side of a rule, are called "non-terminal" symbols. If a single non-terminal symbol occurs in the right-hand side of the rule after all terminal symbols occur in the rule, the rule is "right-linear". In contrast, a rule with a single non-terminal symbol in the output, occurring before all terminal symbols, is "left-linear". A rule that has only terminal symbols or only non-terminal symbols on the right-hand side of a rule can be either right-linear or left-linear. If none of these cases occurs, the rule is neither right-linear nor left-linear.

A subset of the rules in a grammar form a "strongly connected component" if the non-terminal symbols in that subset appear on the left-hand side of one or more rules of the subset and on the right-hand side of one or more other rules of the subset, such that those rules form a mutually inter-dependent subset of the rules of that grammar. For example, in the grammar G shown in FIG. 1, in the fourth line, X appears on the left-hand side of the rule, while Y appears on the right-hand side of the rule. In contrast, in the fifth line Y appears on the left-hand side of the rule, while X appears on the right-hand side of the rule. Accordingly X and Y are members of a strongly connected component corresponding to the subset of the grammar G that includes rules 4 and 5.

FIG. 2 illustrates one exemplary embodiment of an input format of the grammar G that is usable in various exemplary embodiments of the systems and methods according to this invention. In FIG. 2, there is one line in the input format for the grammar G for each rule in the grammar G shown in FIG. 1. The values in the first column 1210 of the input format of the rules of the grammar G are unique representations of the symbols in the input grammar. In this input format, each symbol in the input grammar G is assigned a number. For example, in the exemplary embodiment of the input format shown in FIG. 2, the non-terminal symbols "T", "X", "Y" and "Z" are assigned the numerals 1-4 respectively. The other non-terminal and terminal symbols are assigned reference numerals in the same manner. The second column 1220 represents the cost value if the input grammar is weighted. It should be appreciated that the second column 1220 is omitted for non-weighted grammars.

Finite-state automata are classical computational devices used in a variety of large-scale applications, such as text processing, speech processing and recognition, image processing and the like. Some applications in text, speech and image processing and recognition require weighted finite-state automata, which are more general devices, to account for the variability of the data and to rank various hypotheses generated during the processing or recognition process. A weighted finite-state automaton is a finite-state automaton in which each transition or edge between two states is labeled with some weight, in addition to the usual input symbol. Finite-state transducers are finite-state automata whose transitions or edges are additionally provided with an output label.

Figure 3:
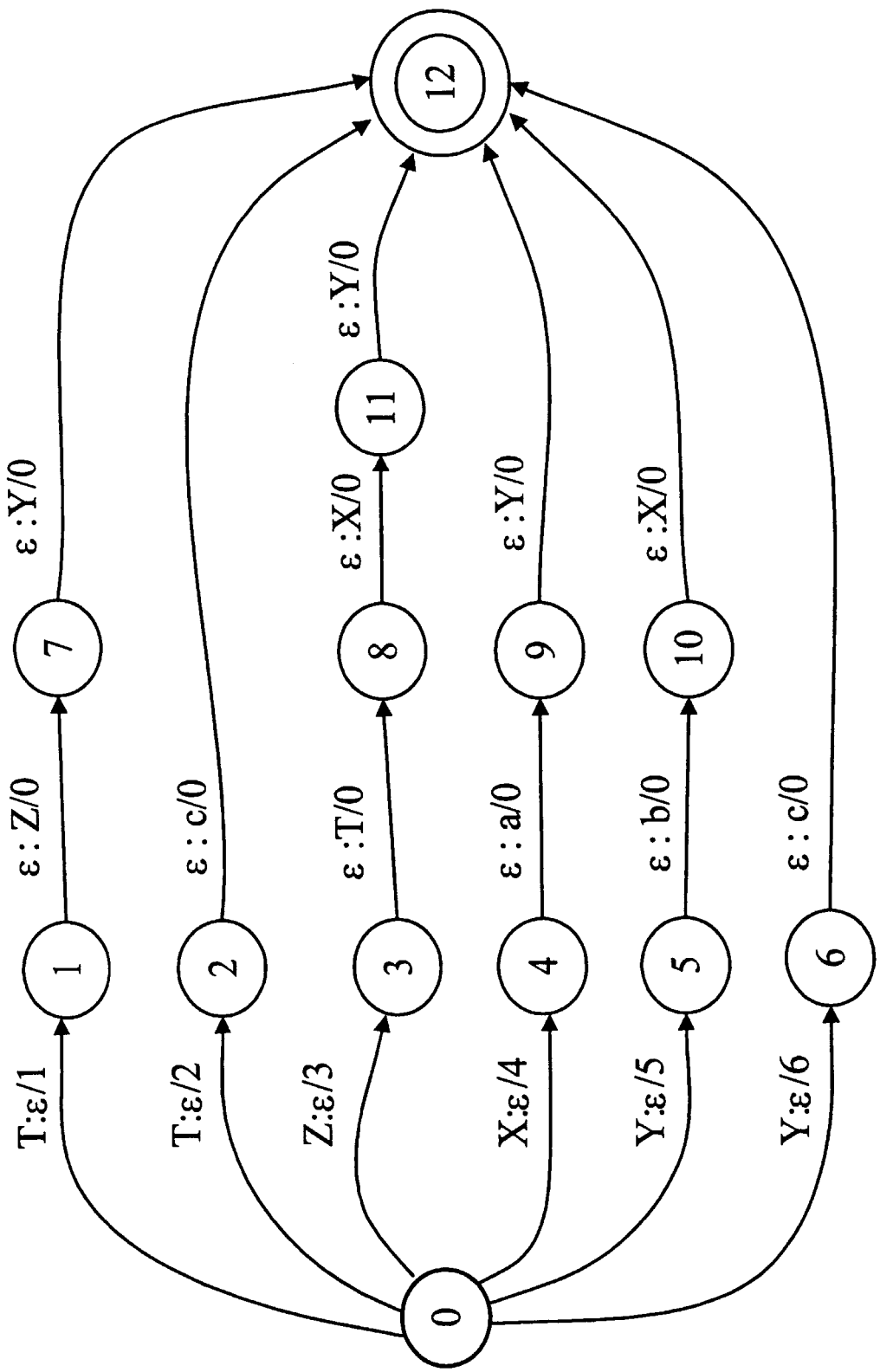
FIG. 3 illustrates one exemplary embodiment of a weighted finite-state transducer generated from the exemplary grammar G according to this invention.

FIG. 3 illustrates one exemplary embodiment of a finite-state transducer $T_G$ representing the grammar G. Each path in the finite-state transducer $T_G$, from the initial state 0 to the final state 12 of the finite-state transducer $T_G$, represents one of the rules of grammar G shown in FIG. 1. That is, there is a path in the finite-state transducer $T_G$ for each rule in the grammar G. For each symbol that appears on a given rule of the grammar G, there is a corresponding edge in the path through the finite-state transducer $T_G$ that represents that particular rule. For each edge, that edge in finite-state transducer $T_G$ is labeled with the symbol from the grammar G rule or rules it represents. For a given rule, each labeled edge in the path that corresponds to that rule occurs in the same sequence as the symbols appear in that rule. Also as is known in the art, the paths within the finite-state transducer may include $\epsilon$-transitions (as indicated through the use of the notation "$\epsilon$") as shown in FIG. 3 as a result of, for example, processing a grammar with a GRM library function such as grmread.

Figure 4:
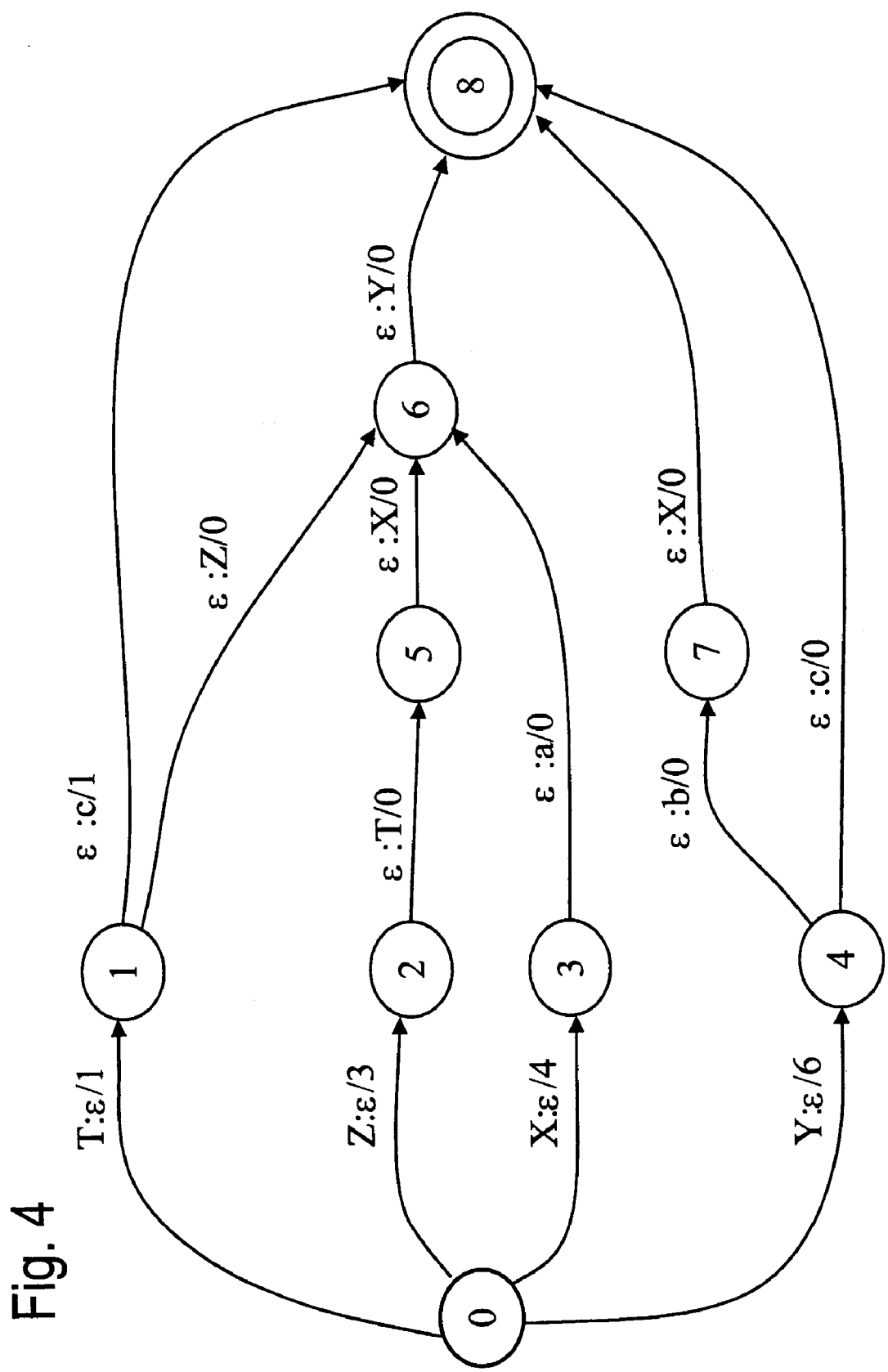
FIG. 4 illustrates one exemplary embodiment of a minimized weighted finite-state transducer generated from the weighted finite-state transducer shown in FIG. 3 according to this invention.

FIG. 4 shows the finite-state transducer $T_G'$ shown in FIG. 3 after being minimized. In forming the minimized finite-state transducer $T_G'$ shown in FIG. 4 from the original finite-state transducer $T_G$ shown in FIG. 3, edges with similar input symbols or output symbols have been combined to reduce the redundancy in the original finite-state transducer $T_G$. In particular, in generating the minimized finite-state transducer $T_G'$ shown in FIG. 4, the states 1 and 2 of the original finite-state transducer $T_G$ shown in FIG. 3 each have an edge labeled with the same symbol and extending from the same initial state. As a result, these states of the original finite-state transducer $T_G$ shown in FIG. 3 are combined into a single state 1, having an edge labeled with that symbol and ending at the state 1, as in the minimized finite-state transducer $T_G'$ shown in FIG. 4.

States 7, 9 and 11 of the original finite-state transducer $T_G$ shown in FIG. 3 each has an edge that has the same symbol and ends at the same end state. As a result, states 7, 9 and 11 of the original finite-state transducer $T_G$ shown in FIG. 3 are combined to form a state 6 of the minimized finite-state transducer $T_G'$ shown in FIG. 4, which has the edge labeled with the same symbol and extending to that end state.

Figure 5:
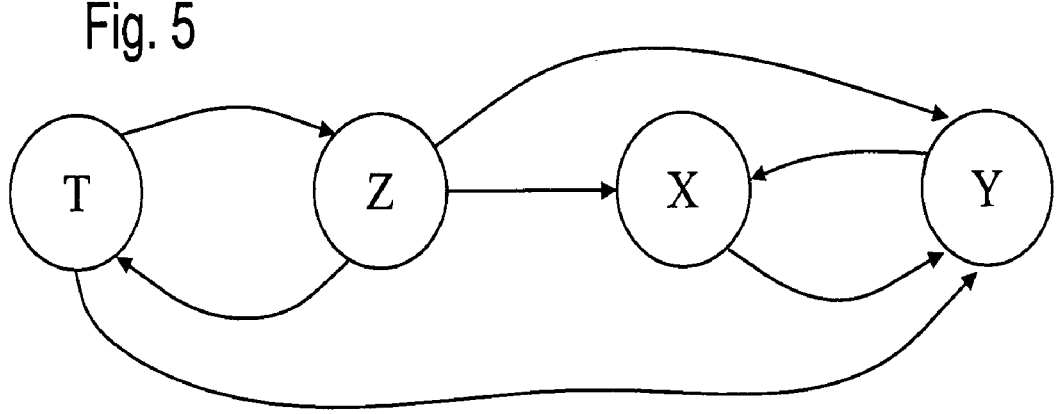
FIG. 5 illustrates one exemplary embodiment of a dependency graph generated from the finite-state transducer shown in FIG. 4 according to this invention.

A dependency graph, according to this invention, is a finite state machine that represents the dependency relationships of non-terminal symbols on the left-hand side of a rule in a grammar to the non-terminal symbols in the right-hand side of that rule. The dependency graph has an edge for each specific input non-terminal symbol to output non-terminal symbol relationship. FIG. 5 illustrates one exemplary embodiment of a dependency graph representing the grammar G. The dependency graph shown in FIG. 5 has a state for each non-terminal symbol in the grammar G. The dependency graph shown in FIG. 5 also has an edge for each non-terminal symbol that appears on the right-hand side of a rule, which ends at the state representing that non-terminal symbol and begins at state representing the non-terminal symbol on the left-hand side of that rule. For example, the first rule in the grammar G shown in FIG. 1 has an input non-terminal symbol of T and the non-terminal symbols Z and Y in the output. As a result, edges exist in the dependency graph, shown in FIG. 5, from the state T to the state Z and from the state T to the state Y.

Figure 6:
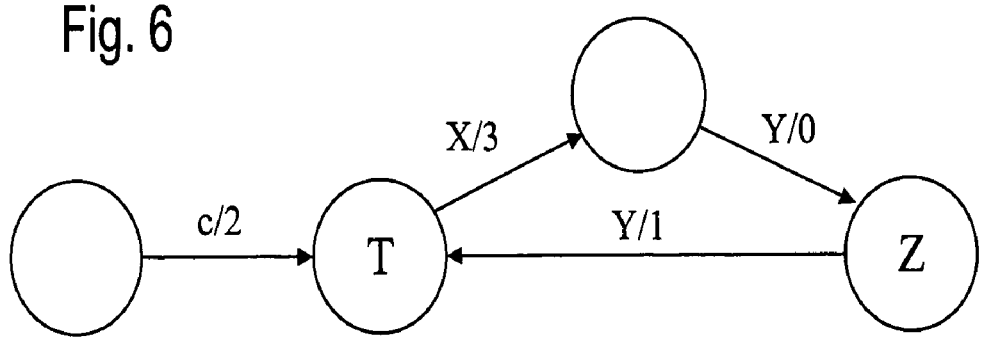
FIG. 6 illustrates one exemplary embodiment of a weighted finite-state automaton representing the strongly connected component S{T,Z} of the finite-state transducer shown in FIG. 4, identified using the dependency graph shown in FIG. 5 according to this invention.
Figure 7:
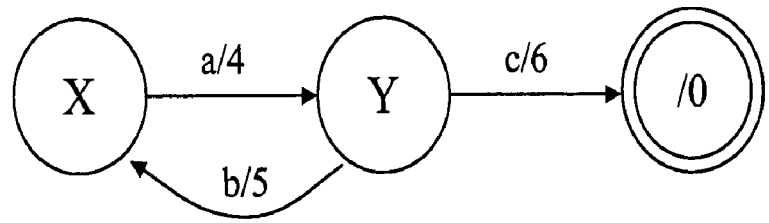
FIG. 7 illustrates one exemplary embodiment of a weighted finite-state automaton representing the strongly connected component S{X,Y} of the finite-state transducer shown in FIG. 4, identified using the dependency graph shown in FIG. 5 according to this invention.

FIGS. 6 and 7 illustrate exemplary embodiments of finite-state automata K(S) respectively representing one of the strongly connected components S{T,Z} and S{X,Y} of the grammar G. The finite-state automata K(S) shown in FIGS. 6 and 7 are subsections of the minimized finite-state transducer $T_G'$ shown in FIG. 4. The finite-state automata K(S) shown in FIGS. 6 and 7 contain the paths of the minimized finite-state transducer $T_G$ that define the mutually dependent relationships of the corresponding strongly connected components S{X,Y} or S{T,Z}. Each of the finite-state automata K(S) shown in FIGS. 6 and 7 has a state for each non-terminal symbol in the corresponding strongly connected component. Paths from the minimized finite-state transducer $T_G'$ shown in FIG. 4 are incorporated into the finite-state automata shown in FIGS. 6 and 7. For each terminal symbol and for each non-terminal symbol that is a member of the strongly connected component, an edge is added to the finite-state automaton for that strongly connected component. It should also be appreciated that any non-terminal symbol of the grammar that does not appear in that strongly connected component is treated as a terminal symbol relative to that strongly connected component. The final state is represented by the double circles around "/0".

Figure 8:
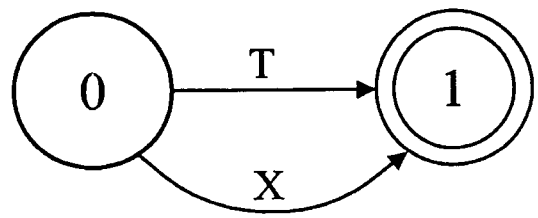
FIG. 8 illustrates one exemplary embodiment of a finite-state automaton representing an input topology that accepts a subset of active non-terminal symbols of the finite-state transducer shown in FIG. 4 according to this invention.

According to this invention, a topology defines a specific set of conditions under which the user intends to apply the input grammar. The topology identifies any specific constraints on the grammar rules that may be needed as starting points when the grammar is applied. FIG. 8 illustrates one exemplary embodiment of a simple finite-state automaton representing a topology input by a user to be used in applying the grammar G. The simple finite-state automaton shown in FIG. 8 has an initial state, a final state and edges representing the active non-terminal symbols or the first rules of the grammar to be applied.

Figure 9:
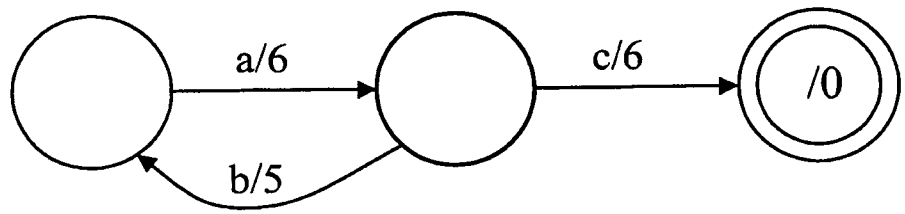
FIG. 9 illustrates a first exemplary embodiment of a finite-state automaton M(Y) that accepts the non-terminal symbol Y as an active terminal symbol, obtained from the finite-state automaton shown in FIG. 7 according to this invention.

FIG. 9 illustrates a first exemplary embodiment of a modified form M(Y) of the finite-state automaton K(S) shown in FIG. 7 corresponding to the strongly connected component S{X,Y}. The finite-state automaton M(Y) shown in FIG. 9 is used to replace an edge labeled with the symbol Y, and that edges beginning and end states, when expanding the simple finite-state automaton shown in FIG. 8, which represents the input topology, into the expanded automaton that is used to apply the grammar G. Since the strongly connected component S{X,Y} is right-linear, the corresponding finite-state automaton K(S) shown in FIG. 7 already has a final state. The finite-state automaton K(S) shown in FIG. 7 is then modified by changing the state labeled Y into an initial state. The finite-state automaton M(Y) shown in FIG. 9 thus now has an initial and final state. Therefore, the finite-state automaton M(Y) shown in FIG. 9 can be used in place of an edge labeled with the non-terminal Y and the beginning and end states of that edge.

Figure 10:
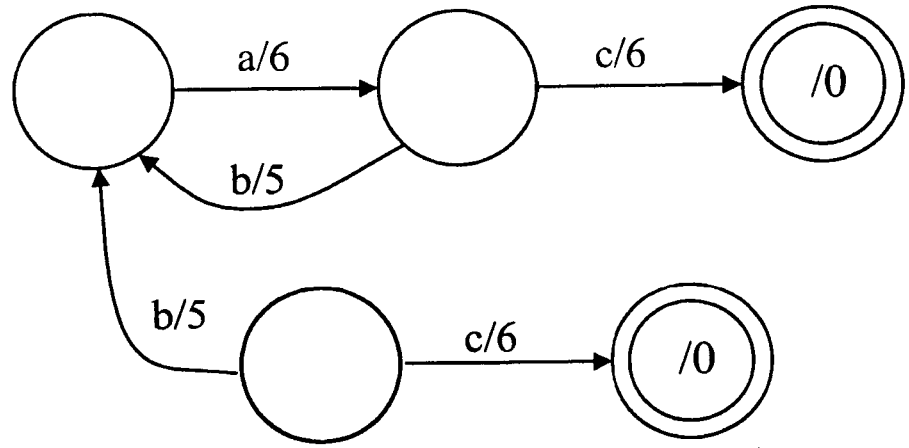
FIG. 10 illustrates a second exemplary embodiment of a finite-state automaton M(Y) that accepts the non-terminal symbol Y as an active terminal symbol, obtained from the finite-state automaton shown in FIG. 7 according to this invention.

FIG. 10 illustrates a second exemplary embodiment of a modified form M(Y)' of the finite-state automaton K(S) corresponding to the strongly connected component S{X,Y} shown in FIG. 7. The purpose of the finite-state automaton M(Y)' shown in FIG. 10 is also to replace an edge labeled with the symbol Y when expanding the simple finite-state automaton shown in FIG. 8. Since the strongly connected component S{X,Y} is right-linear, the corresponding finite-state automaton K(S) shown in FIG. 7 already has a final state. The finite-state automaton K(S) shown in FIG. 7 is then modified by creating a new initial state with edges identical to those starting from the state labeled Y and no edges ending at that new initial state. The finite-state automaton M(Y)' shown in FIG. 10 thus now has an initial state, where the costs associated with the edge extending from that initial state can be modified without changing the costs associated with the original edges in the finite-state automaton K(S) shown in FIG. 7. The finite-state automaton M(Y)' shown in FIG. 10 can thus be used in place of the edge labeled with the non-terminal symbol Y and the beginning and end states of that edge, with the same costs associated with both the previous edge and the inserted finite-state automaton.

Figure 11:
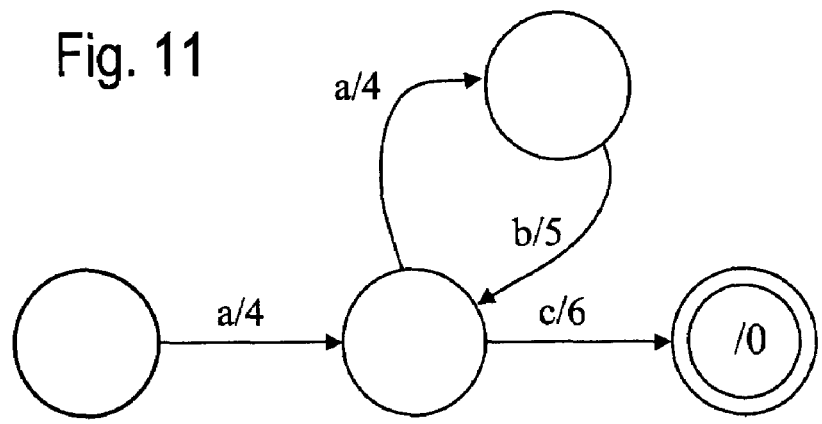
FIG. 11 illustrates one exemplary embodiment of a finite-state automaton M(X) that accepts the non-terminal symbol X as an active terminal symbol, obtained from the finite-state automaton shown in FIG. 7 according to this invention.

FIG. 11 illustrates a first exemplary embodiment of a modified form M(X) of the finite-state automaton K(S) shown in FIG. 7 corresponding to the strongly connected component S{X,Y}. The finite-state automaton M(X) shown in FIG. 11 likewise can be used in place of an edge labeled with the non-terminal symbol X when expanding the simple finite-state automaton shown in FIG. 8. Since the strongly connected component S{X,Y} is right-linear, the finite-state automaton K(S) shown in FIG. 7 already has a final state. The finite-state automaton K(S) shown in FIG. 7 is then modified by creating a new initial state with edges identical to those starting from the state labeled X and no edges ending at that new initial state. The finite-state automaton M(X) shown in FIG. 11 thus now has an initial state where the costs associated with the edge extending from that initial state can be modified without changing the costs associated with the original edges in the finite-state automaton K(S) shown in FIG. 7. The finite-state automaton M(X) shown in FIG. 11 can thus be used in place of the edge labeled with the non-terminal symbol X and the beginning and end states of that edge, with the same cost associated with both the previous edge and the inserted finite-state automaton.

Figure 12:
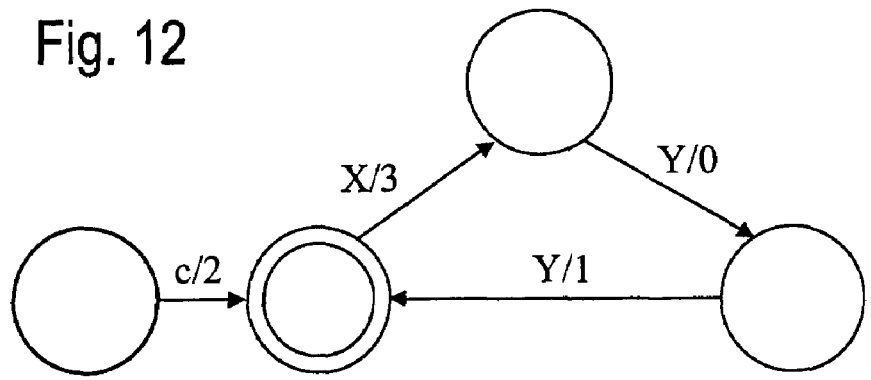
FIG. 12 illustrates one exemplary embodiment of a finite-state automaton M(T) that accepts the non-terminal symbol T as an active terminal symbol, obtained form the finite-state automaton shown in FIG. 6 according to this invention.

FIG. 12 illustrates a first exemplary embodiment of a modified form M(T) of the finite-state automaton K(S) shown in FIG. 6 corresponding to the strongly connected component S{T,Z}. The finite-state automaton M(T) shown in FIG. 12 can likewise be used in place of an edge labeled with the non-terminal symbol T when expanding the simple finite-state automaton shown in FIG. 8. Since the strongly connected component S{T,Z} is left-linear, the finite-state automaton K(S) shown in FIG. 6 already has an initial state. The finite-state automaton K(S) shown in FIG. 6 is then modified by changing the state labeled T into a final state. The finite-state automaton M(T) shown in FIG. 12 thus now has an initial and final state. Accordingly, the finite-state automaton M(T) shown in FIG. 12 can be used in place of the edge labeled with the non-terminal symbol T and the beginning and end states of that edge.

Figure 13:
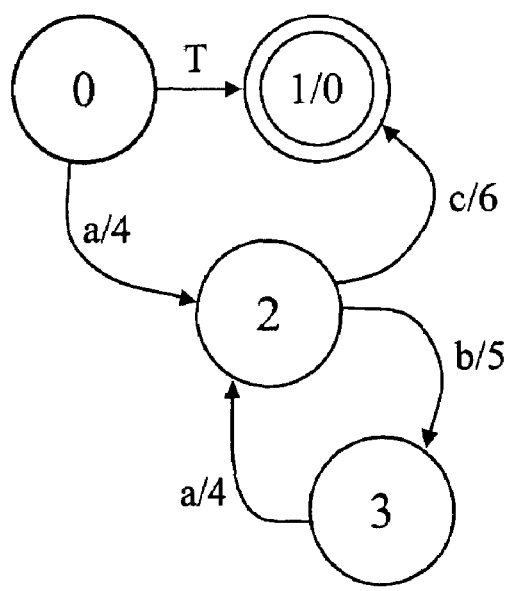
FIG. 13 illustrates a first exemplary embodiment of an expanded finite-state automaton generated by substituting the finite-state automaton shown in FIG. 11 for the edge labeled with the symbol X in the finite-state automaton shown in FIG. 8 according to this invention.

FIG. 13 illustrates one exemplary embodiment of a finite-state automaton expanded from the simple finite-state automaton shown in FIG. 8. The simple finite-state automaton shown in FIG. 8 is expanded in this way when the rules of the grammar G that are associated with the strongly connected component S{X,Y} are to be applied because the edge being replaced is labeled with the non-terminal symbol X. The expansion is performed by substituting the finite-state automaton M(X) shown in FIG. 11 for the edge labeled with the non-terminal symbol X. The state from which the edge labeled with the non-terminal symbol X extends is used as the initial state for the finite-state automaton M(X). The state at which the edge labeled with the non-terminal symbol X ends at, is used as the terminal state for the finite-state automaton M(X). For this substitution, the finite-state automaton M(X) was further modified to create a new initial state. This was done because, without modification, the state labeled X in the finite-state automaton K(S) shown in FIG. 7 has edges ending at that state that, when combined with the simple automaton shown in FIG. 8, would incorrectly modify the behavior of the initial state of the simple automaton shown in FIG. 8.

Figure 14:
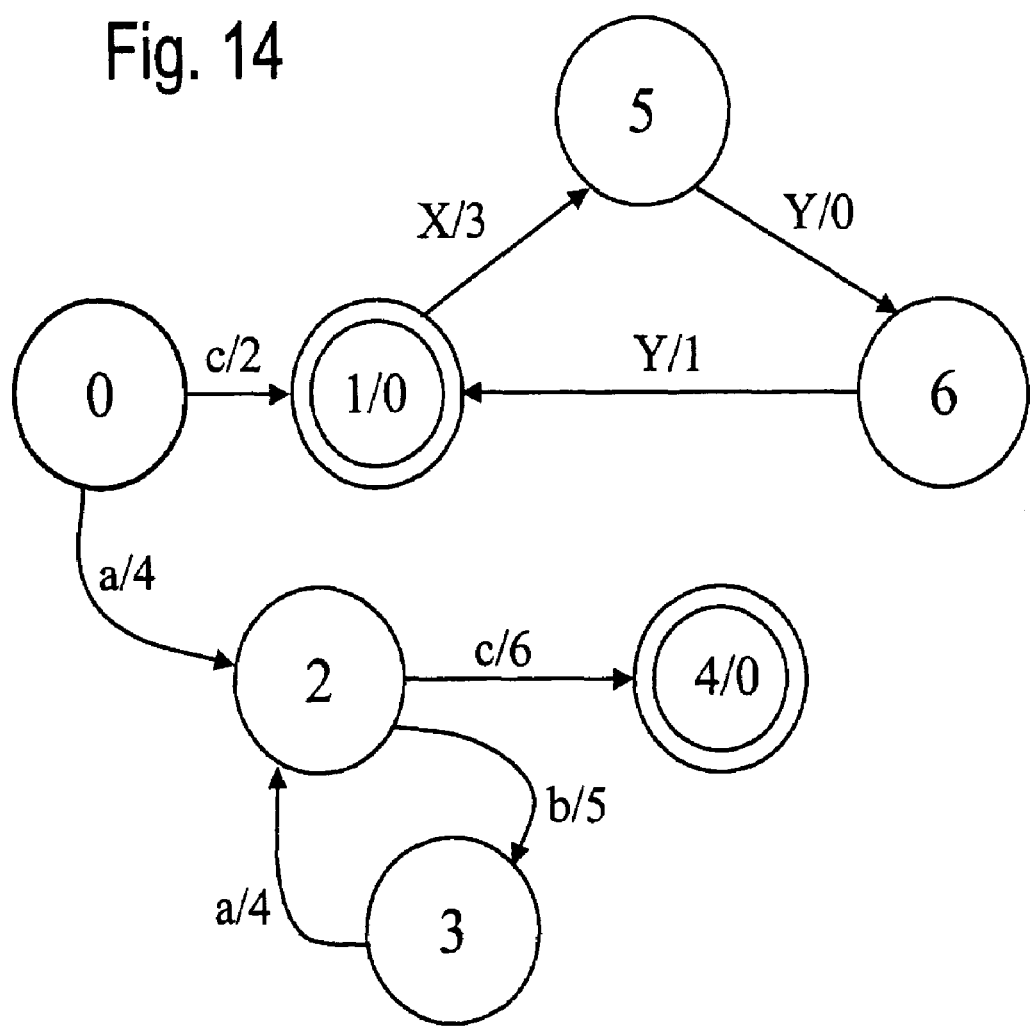
FIG. 14 illustrates a second exemplary embodiment of an expanded finite-state automaton generated by substituting the finite-state automaton shown in FIG. 12 for the edge labeled with the symbol T shown in FIG. 13 according to this invention.

FIG. 14 illustrates one exemplary embodiment of a finite-state automaton expanded from the finite-state automaton shown in FIG. 13. The finite-state automaton shown in FIG. 13 is expanded in this way when the rules of the grammar G that are associated with the strongly connected component S{T, Z} are to be applied because the edge being replaced is labeled with the non-terminal symbol T. The expansion is performed by substituting the finite-state automaton M(T), shown in FIG. 12, for the edge labeled with the non-terminal symbol T. The state, which the edge labeled with the non-terminal symbol T extends from, is used as the initial state for the finite-state automaton M(T). A new terminal state is used as the terminal state for the finite-state automaton M(T). Otherwise, the edge leaving the terminal state in the finite-state automaton M(T) would incorrectly modify the terminal state of the finite-state automaton shown in FIG. 13.

Figure 15:
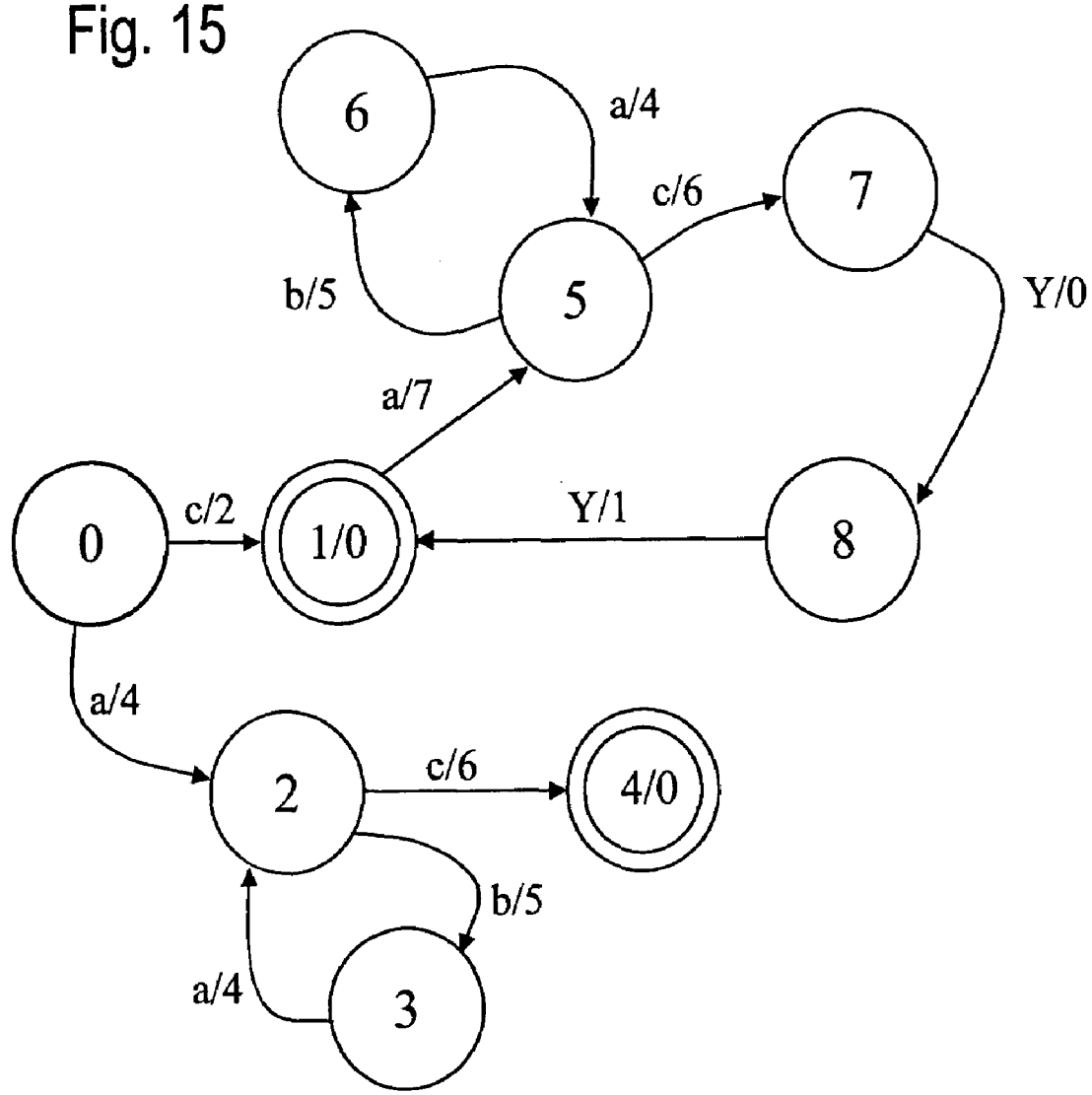
FIG. 15 illustrates a third exemplary embodiment of an expanded finite-state automaton generated by substituting the finite-state automaton shown in FIG. 11 for the edge labeled with the symbol X and weight 3 shown in FIG. 14 according to this invention.

FIG. 15 illustrates one exemplary embodiment of a finite-state automaton expanded from the finite-state automaton shown in FIG. 14. The finite-state automaton shown in FIG. 14 is expanded in this way when the rules of the grammar G that are associated with the strongly connected component S{X,Y} are to be applied because the edge being replaced is labeled with the non-terminal symbol X. The expansion is performed by substituting the finite-state automaton M(X), shown in FIG. 11, for the edge labeled with the non-terminal symbol X and having a weight of 3. The state, which the edge labeled with the non-terminal symbol X and having a weight of 3 extends from, is used as the initial state for the finite-state automaton M(X). The state, which the edge labeled with the non-terminal symbol X and having a weight of 3 ends at, is used as the terminal state for the finite-state automaton M(X). The weight 3 of the edge labeled with the non-terminal symbol X is added to the weight of the edges extending from the initial state of the finite-state automaton M(X). For this substitution, the finite-state automaton M(X) was modified to create a new initial state such that the finite-state automaton M(X) shown in FIG. 11 has an initial state where the costs of the edge extending from that new initial state can be modified without changing the weights of the original edges in the finite-state automaton K(S) shown in FIG. 7.

Figure 16:
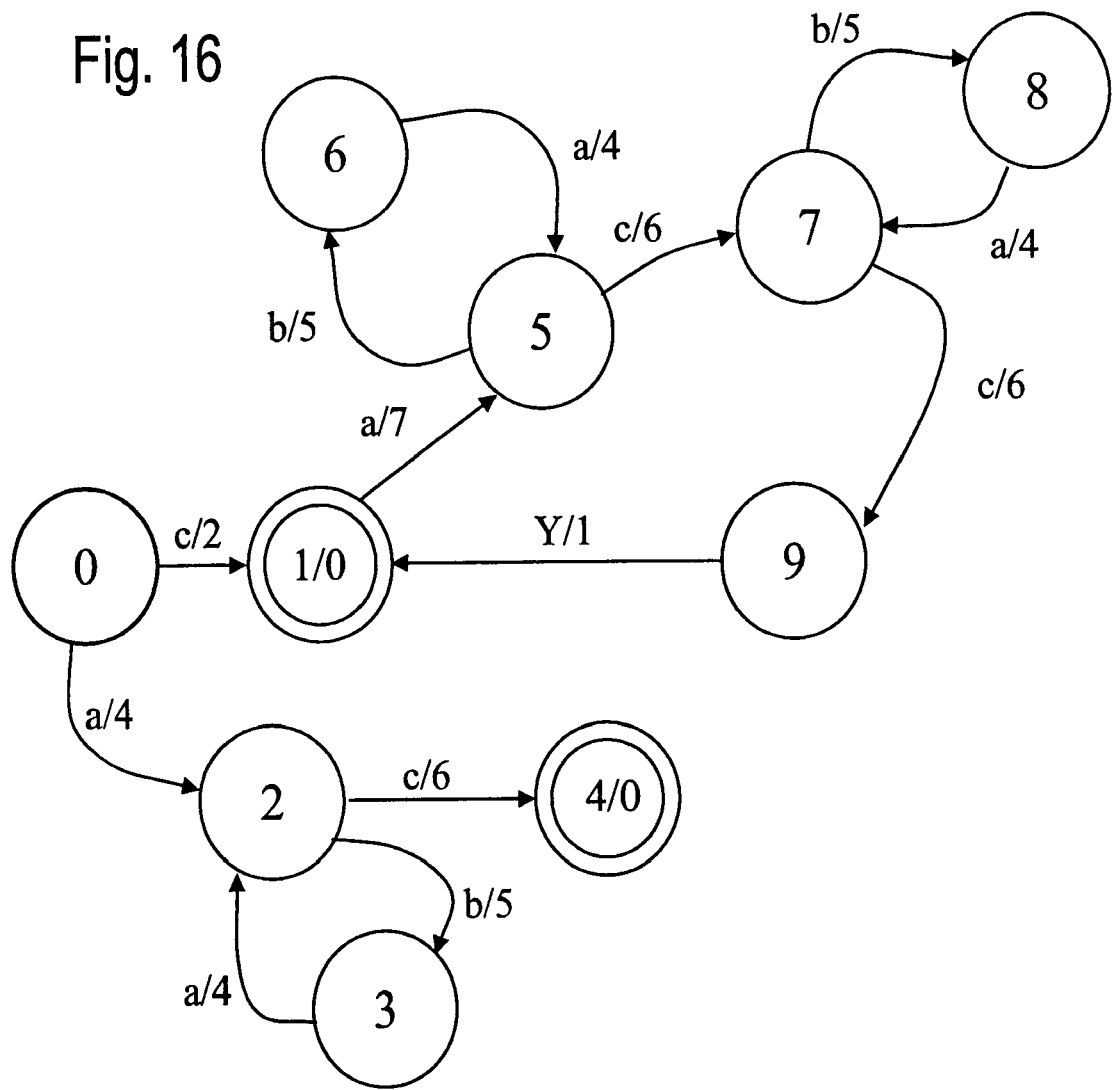
FIG. 16 illustrates a fourth exemplary embodiment of an expanded finite-state automaton generated by substituting the finite-state automaton shown in FIG. 9 for the edge labeled with the symbol Y and weight zero shown in FIG. 15 according to this invention.

FIG. 16 illustrates one exemplary embodiment of a finite-state automaton expanded from the finite-state automaton shown in FIG. 15. The finite-state automaton shown in FIG. 15 is expanded in this way when the rules of the grammar G that are associated with the strongly connected component S{X,Y} are to be applied because the edge being replaced is labeled with the non-terminal symbol Y. The expansion is performed by substituting the finite-state automaton M(Y), shown in FIG. 9, for the edge labeled with the non-terminal symbol Y and having a weight of 0. The state, which the edge labeled with the non-terminal symbol Y and having a weight of 0 extends from, is used as the initial state for the finite-state automaton M(Y). The state, which the edge labeled with the non-terminal symbol Y and having a weight of 0 ends at, is used as the terminal state for the finite-state automaton M(Y).

Figure 17:
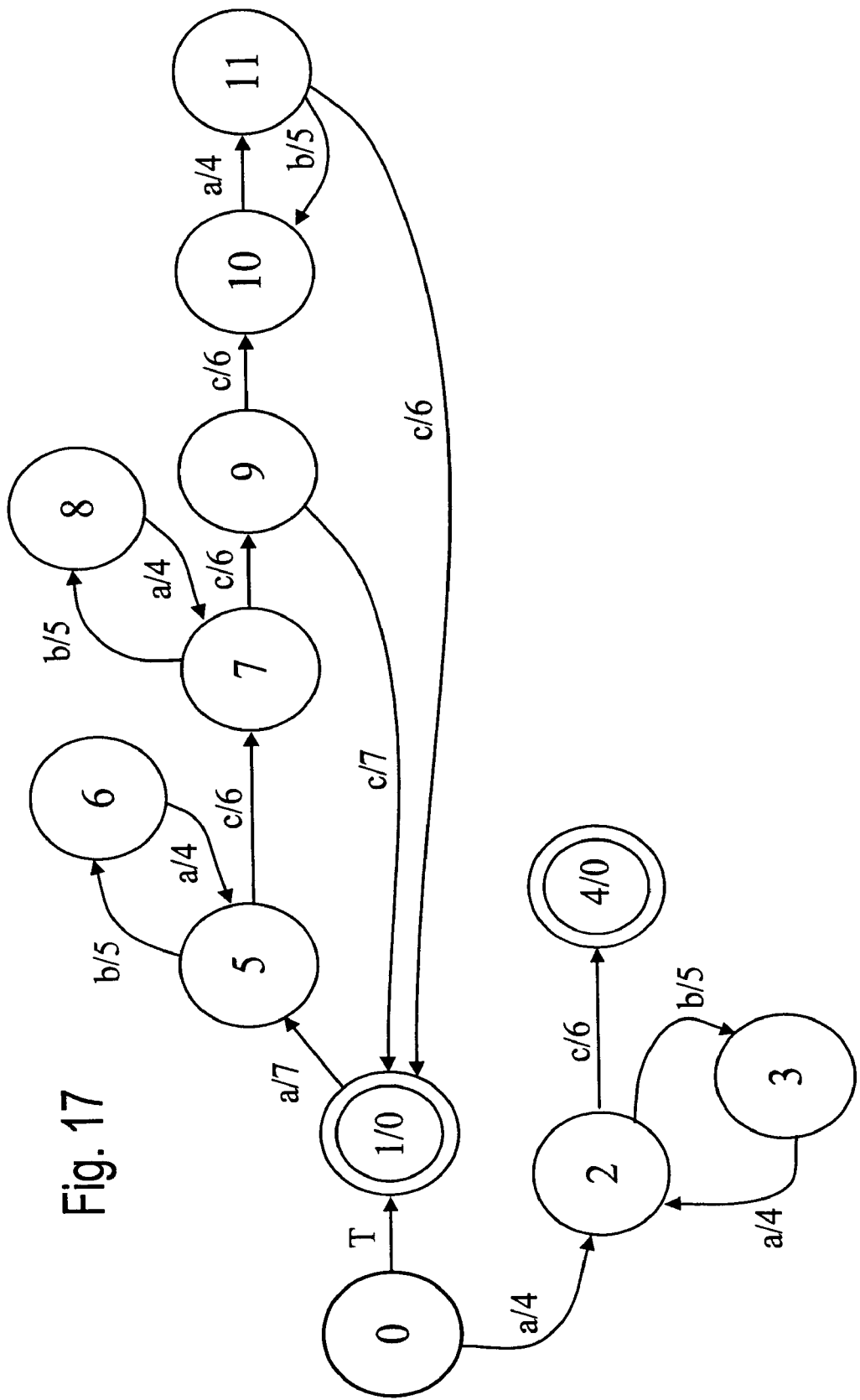
FIG. 17 illustrates a fifth exemplary embodiment of an expanded finite-state automaton generated by substituting the finite-state automaton shown in FIG. 10 for the edge labeled with the symbol Y and weight 1 shown in FIG. 16 according to this invention.

FIG. 17 illustrates one exemplary embodiment of a finite-state automaton expanded from the finite-state automaton shown in FIG. 16. The finite-state automaton shown in FIG. 16 is expanded in this way when the rules of the grammar G that are associated with the strongly connected component S{X,Y} are to be applied because the edge being replaced is labeled with the non-terminal symbol Y. The expansion is performed by substituting the finite-state automaton M(Y), shown in FIG. 10, for the edge labeled with the non-terminal symbol Y and having a weight of 1. The state, which the edge labeled with the non-terminal symbol Y and having a weight of 1 extends from, is used as the initial state for the infinite-state automaton M(Y). The state, which the edge labeled with the non-terminal symbol Y and having a weight of 1 ends at, is used as the terminal state for the finite-state automaton M(Y). The weight 1 of the edge labeled with the non-terminal symbol Y is added to the weight of the edges extending from the initial state of the finite-state automaton M(Y). For this substitution, the finite-state automaton M(Y) was modified to create a new initial state such that the finite-state automaton M(Y) shown in FIG. 10 has an initial state where the costs of the edge extending from that new initial state can be modified without changing the weights of the original edges in the finite-state automaton K(S) shown in FIG. 7. Because the finite-state automaton shown in FIG. 17 has no edges remaining that are labeled with non-terminal symbols of the grammar, there are no edges requiring substitution by one of the finite-state automata M(X), M(Y), M(Z) or M(T) shown in FIGS. 9-12.

Figure 18:
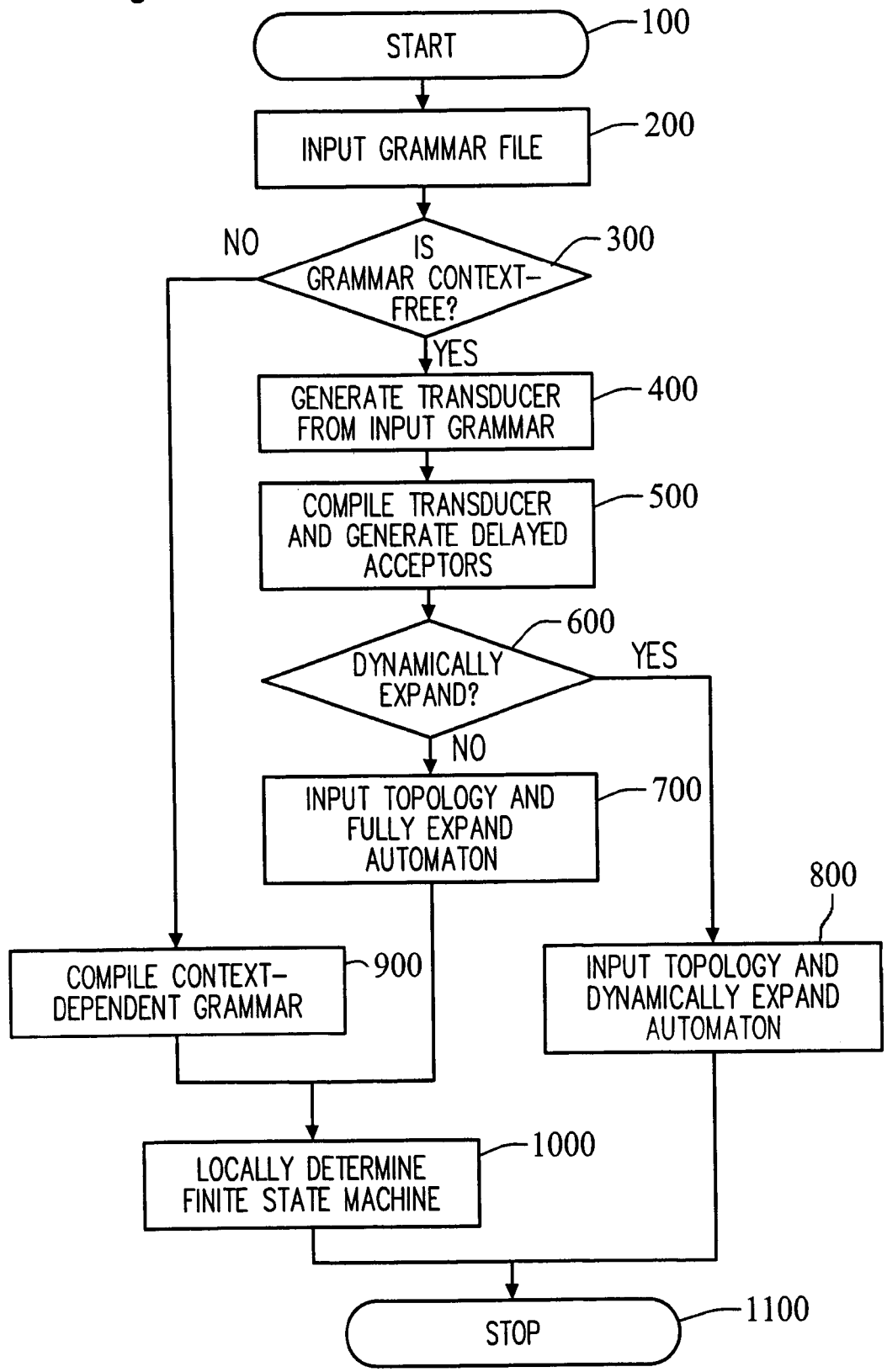
FIG. 18 is a flowchart outlining one exemplary embodiment of a method for converting a grammar into a finite-state automaton according to this invention.

FIG. 18 is a flowchart outlining one exemplary embodiment of a method for generating weighted finite-state acceptors and finite-state transducers from context-dependent grammars and/or context-free grammars according to this invention. As shown in FIG. 18, operation of the method begins in step 100 and continues to step 200, where a grammar is input. Then, in step 300, a determination is made whether the input grammar is a context-free grammar or a context-dependent grammar. If the input grammar is a context-free grammar, operation continues to step 400. Otherwise, operation jumps to step 900.

In step 400, a context-free grammar, such as the grammar G input file shown in FIG. 2, is converted into a finite-state transducer, such as the minimized finite-state transducer $T_G'$ shown in FIG. 4. Next, in step 500, the strongly connected components of the finite-state transducer are identified and are compiled into finite-state automata representing the identified strongly connected components, such as the finite-state automata shown in FIGS. 6 and 7. Then, in step 600, a determination is made whether a finite-state automaton or transducer having a desired topology that defines a use of the grammar will be dynamically expanded. If this finite-state automaton or transducer is to be dynamically expanded, operation jumps to step 800. Otherwise, if the finite-state automaton or transducer is to be expanded and then stored in the expanded form, operation continues to step 700.

In step 700, the finite-state automata generated in step 500 are used to generate a fully expanded finite-state automaton from an input finite-state automaton or transducer having the desired topology. Operation then jumps to step 1000. In contrast, in step 800, the finite-state automata generated in step 500 are used to dynamically and selectively expand a finite-state automaton from specific portions of the input finite-state automaton or transducer having the desired topology. Operation then again jumps to step 1100.

In contrast to both step 700 and step 800, in step 900, the context-dependent grammar is compiled to produce a finite-state transducer. U.S. Pat. No. 6,032,111, incorporated herein by reference in its entirety, discloses one exemplary embodiment of a method for compiling a finite-state transducer from a context-dependent grammar. Operation then continues to step 1000.

In step 1000, the finite-state transducer is locally determinized. U.S. Pat. No. 6,243,679, incorporated herein by reference in its entirety, discloses one exemplary embodiment of a method for determinizing a finite-state transducer. Operation then continues to step 1100, where operation of the method ends.

It should be appreciated that steps 100-500 represent the method for compiling the grammar into a set of finite-state automata that can be combined to accept particular strings. These finite-state automata generated in steps 100-500 can be combined in different ways depending on an initial topology, as outlined below. Thus, in various exemplary embodiments, the method for compiling the grammar into a finite-state automaton or a finite state transducer can stop after step 500. In this case, steps 700 and 1000 form one exemplary embodiment of a method for using the compiled grammar in a static manner, while step 800 forms one exemplary embodiment of a method for using the compiled grammar in a dynamic manner. Thus, it should be appreciated that steps 100-500 need not be followed by any of steps 600-1000 at any particular time. That is, there is no specific temporal relationship between steps 100-500 and any of steps 600-1000. It should further be appreciated that step 1000 can also be omitted. In this case, operation would jump directly from one of steps 700 or 900 to step 1100.

Figure 19:
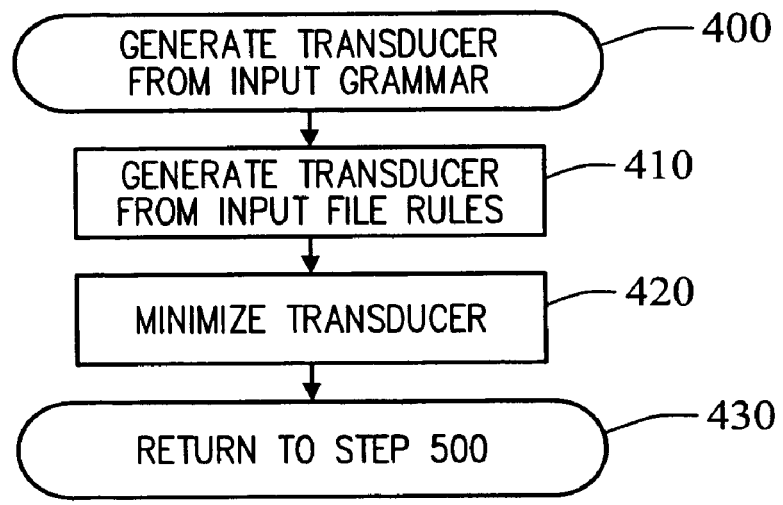
FIG. 19 is a flowchart outlining in greater detail one exemplary embodiment of the method for generating a compacted finite-state transducer from an input grammar according to this invention.

FIG. 19 is a flowchart outlining in greater detail one exemplary embodiment of the method for generating a finite-state transducer, such as that shown in FIG. 4, from an input grammar file, such as that shown in FIG. 2 of step 400 according to this invention. As shown in FIG. 19, operation of the method begins in step 400 and continues to step 410, where a finite-state transducer, such as that shown in FIG. 3, is generated. Then in step 420, the finite-state transducer generated in step 410 is minimized, forming a minimized finite-state transducer such as that shown in FIG. 4. Operation then continues to step 430, where operation returns to step 500.

In step 410, a separate finite-state transducer path from the finite-state transducer initial state to the final state is created from each grammar rule. The first edge in each path is assigned the left-hand symbol of the rules set as the input label of that edge, the empty set as the output label of that edge, and the rule weights set as the cost of that edge. The next edge in each path is assigned the empty string as the input label of that edge, the first symbol on the right-hand side of the grammar rules set as the output label of that edge and the weight set to zero. A new state is added and current edge ends at that state. An additional edge is created for each additional symbol on the right of the grammar rule and that edge is labeled and weighted, and a new end state is created as outlined above. Additional edges and new states are created until there are no more symbols in the grammar. However, it should be appreciated that, for the last symbol of the rule, the edge created for that symbol ends at the terminal state of the finite-state transducer.

When all paths have been created for all grammar rules, the finite-state transducer is completed and operation continues to step 420. Minimization reduces the number of states in the finite-state transducer by combining edges starting at the same state that have the same input label, and combining edges that end in the same state and have the same output label. If the weights of the combined edges are not the same, the difference in weight is pushed down the path to the next edge in that path. The incorporated 679 patent discloses in greater detail one exemplary embodiment of a method for minimizing a finite-state transducer.

Figure 20:
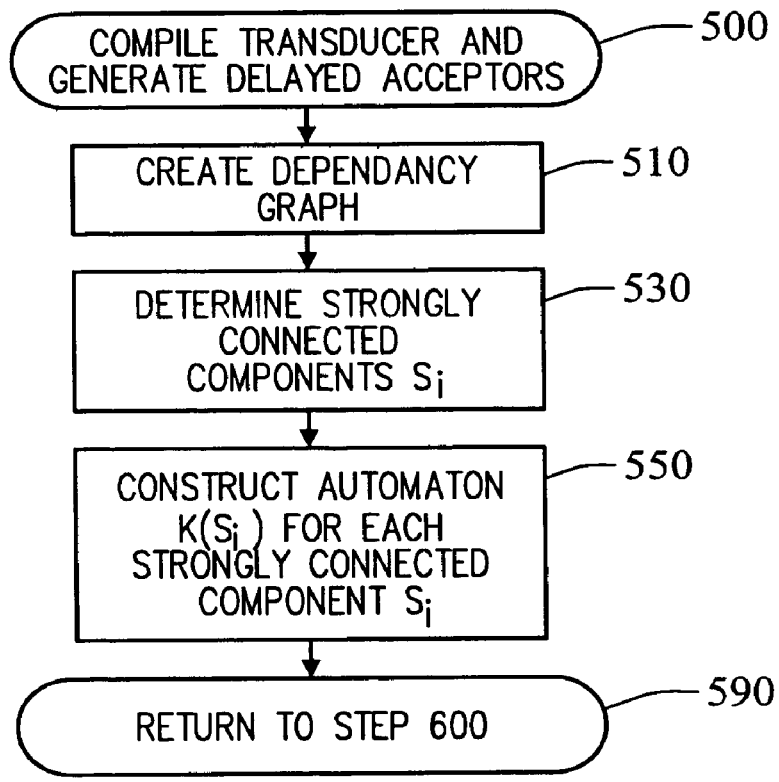
FIG. 20 is a flowchart outlining in greater detail one exemplary embodiment of the method for compiling a finite state transducer representing a context-free grammar of FIG. 18 into one or more finite state automata according to this invention.

FIG. 20 is a flowchart outlining in greater detail one exemplary embodiment of the method for compiling the finite-state transducer to form a replace-class finite-state automaton of FIG. 18 of step 500 according to this invention. As shown in FIG. 20, operation of the method begins in step 500 and continues to step 510, where a dependency graph, such as that shown in FIG. 5, is built using the finite-state transducer created in step 400. Then, in step 530, the dependency graph built in step 510 is used to determine the strongly connected components of the finite-state transducer. Next, in step 550, a finite-state automaton, such as those shown in FIGS. 6 and 7, is constructed from each strongly connected component determined in step 530. Operation then continues to step 590, where operation returns to step 600.

Figure 21:
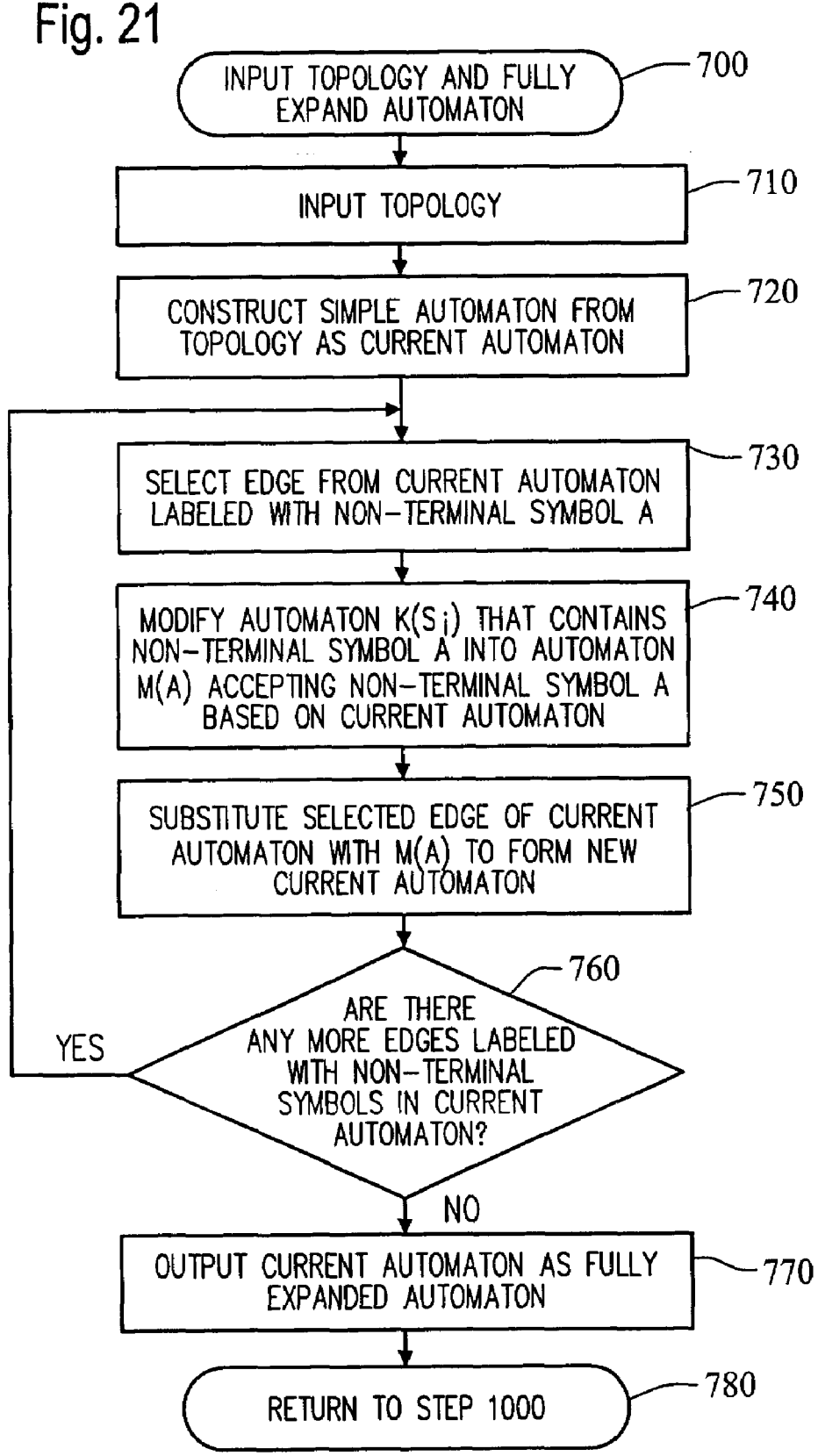
FIG. 21 is a flowchart outlining in greater detail one exemplary embodiment of the method for inputting a topology and fully expanding a finite-state automaton representing context-free grammars of FIG. 20 according to this invention.

FIG. 21 is a flowchart outlining in greater detail one exemplary embodiment of the method for inputting a finite-state transducer or automaton having a desired topology and fully expanding the finite-state automaton representing the finite-state transducer or automaton having that desired topology of step 700 according to this invention. As shown in FIG. 21, operation of the method begins in step 700 and continues to step 710, where a finite-state transducer or automaton having the desired topology is input. Then, in step 720, a simple finite-state automaton, such as that shown in FIG. 8, is constructed from the finite-state transducer or automaton having the desired topology as the current finite-state automaton. Operation then continues to step 730.

In step 730, an edge is selected from the current finite-state automaton, where the non-terminal symbol label of that edge is selected as a current non-terminal symbol label A. Next, in step 740, the finite-state automaton K(S) representing the strongly connected component containing the current non-terminal symbol A, such as one of those shown in FIGS. 6 and 7, is modified into finite-state automaton M(A) which accepts the current non-terminal symbol A, such as one of those shown in FIGS. 9-12. The modified form of the finite-state automaton M(A) is such that the initial and terminal states of the finite-state automaton M(A) are compatible with the current form of the current finite-state automaton. Then, in step 750, the finite-state automaton M(A) is inserted into the current finite-state automaton in place of the selected edge and that edges beginning and end states, thus expanding the current finite-state automaton into a new current finite-state automaton, such as one of those shown on FIGS. 13-17. Operation then continues to step 760.

In step 760, a determination is made whether there any more non-terminal symbols in the current finite-state automaton that need to be expanded. If so, operation returns to step 730. Otherwise, operation continues to step 770. In step 770, the current finite-state automaton is output as a fully expanded finite-state automaton. Operation then continues to step 780, where operation returns to step 1000.

Figure 22:
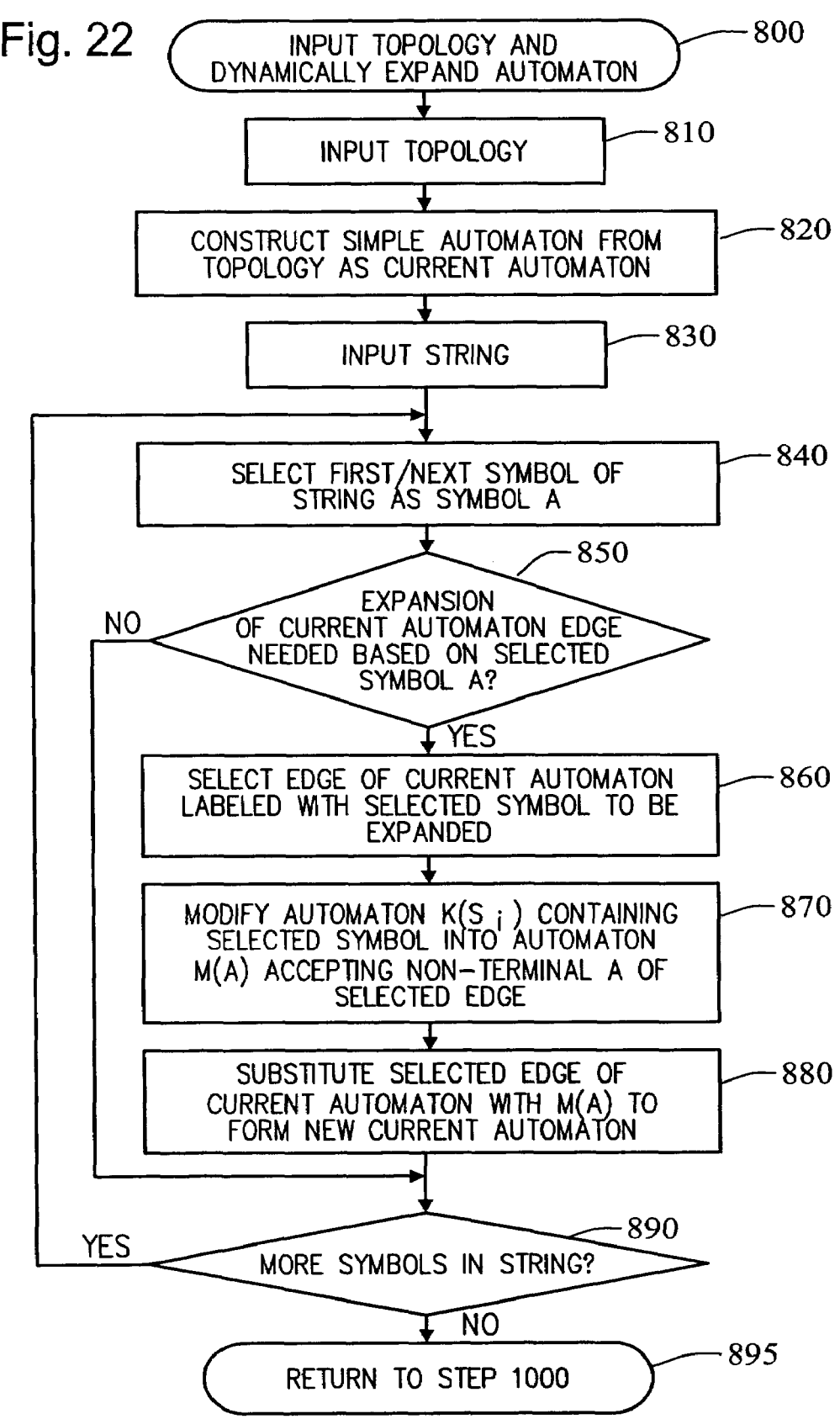
FIG. 22 is a flowchart outlining in greater detail one exemplary embodiment of the method for inputting a topology and expanding on-the-fly a finite-state automaton representing context-free grammars of FIG. 20 according to this invention.

FIG. 22 is a flowchart outlining in greater detail one exemplary embodiment of the method for inputting a desired topology that defines a desired use of the corresponding grammar and for dynamically expanding the finite-state automaton having that desired topology of step 800 according to this invention. As shown in FIG. 22, operation of the method begins in step 800 and continues to step 810, where the topology is input. Then, in step 820, a simple finite-state automaton, such as that shown in FIG. 8, is constructed from the desired topology and identified as the current finite-state automaton. Operation then continues to step 830.

In step 830, a string to be processed by the current automaton generated form the desired topology is input. Next, in step

840, the first or next symbol of the string is selected. Then, in step 850, a determination is made whether expansion of the current finite-state automaton is needed, based on the selected symbol. If expansion is not needed, operation jumps to step 890. Otherwise, operation continues to step 860.

In step 860, an edge having a non-terminal symbol label "A" corresponding to the selected symbol is selected from current finite-state automaton based on the selected symbol. Next, in step 870, the finite-state automaton K(S), representing the strongly connected component containing the non-terminal symbol A, such as those shown in FIGS. 6 and 7, is modified into finite-state automaton M(A) that accepts the non-terminal symbol A, such as one of those shown in FIGS. 9-12. The modified form of the finite-state automaton M(A) is such that initial and terminal states are compatible with the current finite-state automaton. Then, in step 880, the finite-state automaton M(A) is inserted into the current finite-state automaton in place of the selected edge and that edges beginning and end states, thus expanding the current finite-state automaton into a new current finite-state automaton, such as one of those shown in FIGS. 13-17. Operation then continues to step 890.

In step 890, a determination is made whether there any more symbols in the input string. If so, operation returns to step 840. Otherwise, operation continues to step 895, where operation returns to step 1100.

Figure 23:
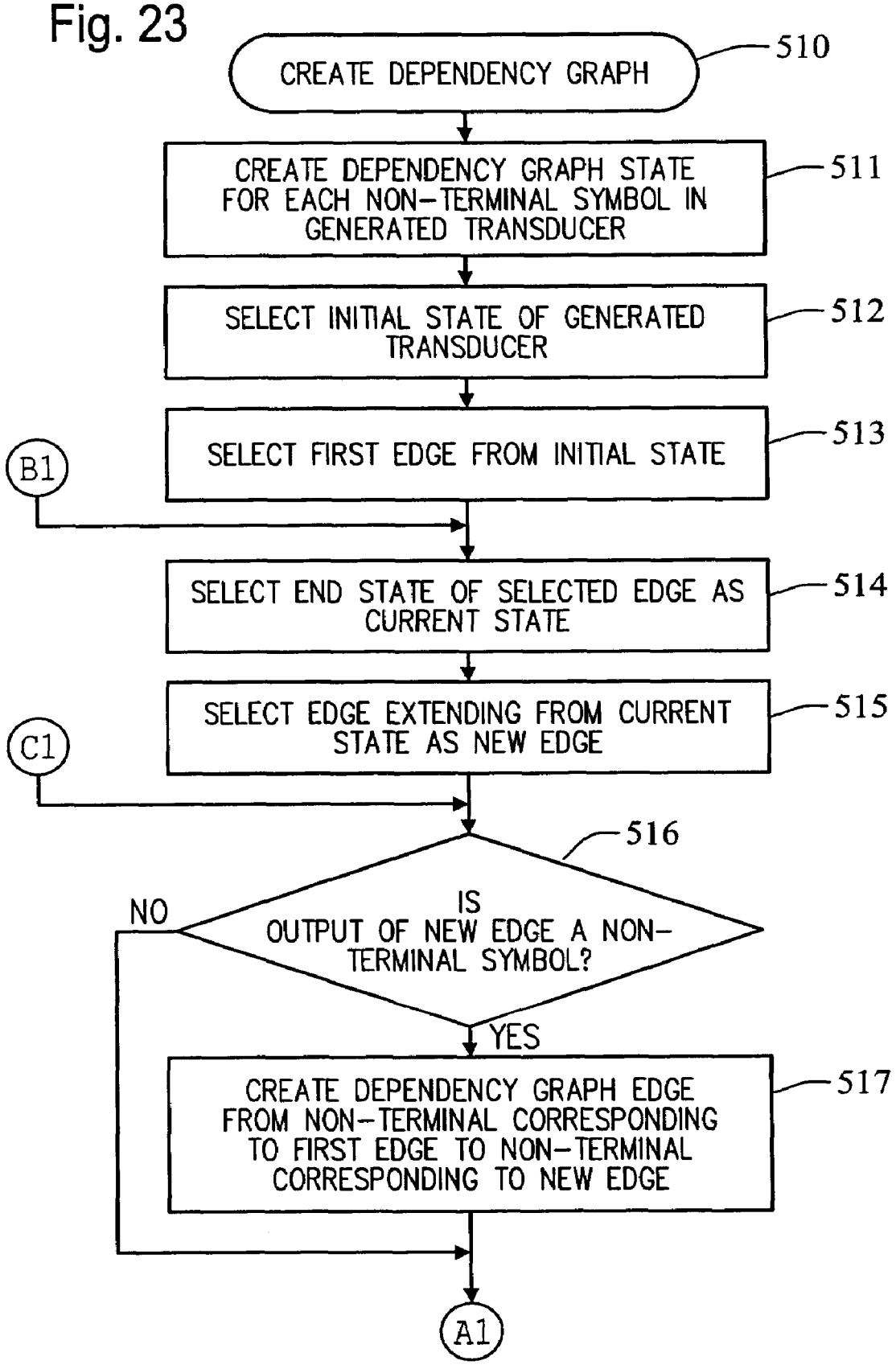
FIGS. 23 and 24 are a flowchart outlining in greater detail one exemplary embodiment of the method for creating a dependency graph representing context-free grammars of FIG. 20 according to this invention.
Figure 24:
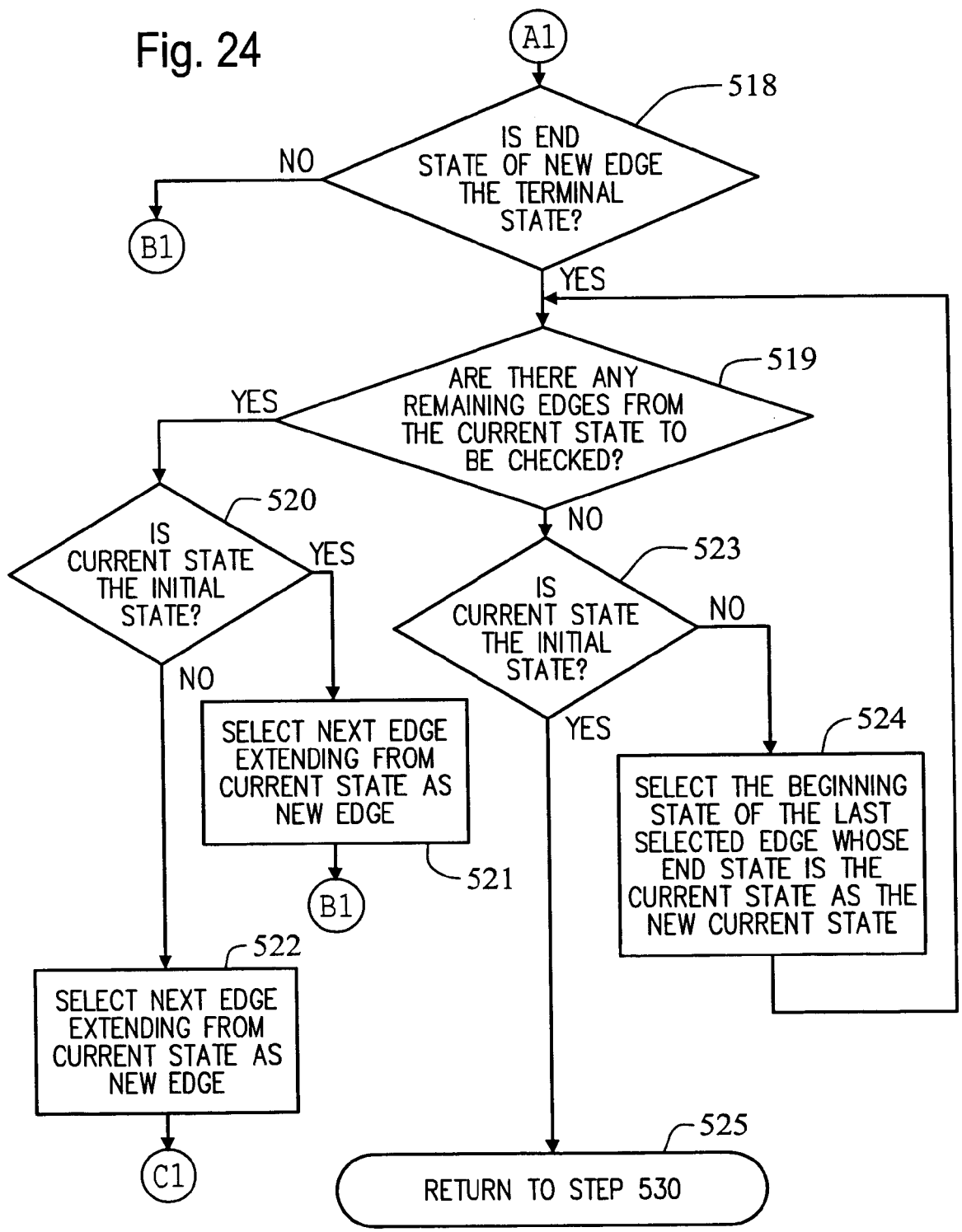

FIGS. 23 and 24 are a flowchart outlining one exemplary embodiment of the method for creating a dependency graph of step 510. As shown in FIGS. 23 and 24, operation of the method begins in step 510 and continues to step 511, where a state or node is created in the dependency graph for each non-terminal symbol of the input finite-state transducer. Next, in step 512, the initial state of the input finite-state transducer is selected. Then, in step 513, a first edge from the initial state of the finite-state transducer is selected. Operation then continues to step 514.

In step 514, the end state of the selected edge is selected as the current state. Then, in step 515, an edge extending from the current state is selected as a new edge. Next, in step 516, a determination is made whether the output label of the new edge is a non-terminal symbol. If the output label of the new edge is a non-terminal symbol, operation continues to step 517. Otherwise, operation jumps directly to step 518.

In step 517, an edge is created in the dependency graph from the state corresponding to the non-terminal symbol, which is the input label of the first edge, to the state corresponding to the non-terminal symbol, which is the output label of the new edge. Next, in step 518, a determination is made whether the end state of the new edge is the terminal state. If the end state of the new edge is the terminal state, operation continues to step 519. Otherwise, operation returns to step 514. By continuing operation at step 519, other paths are checked when the terminal state is reached. By returning to step 514, the current path is continued to check for another edge and state.

In step 519, a determination is made whether there are remaining edges from the current state that have not been checked. If any edges remain to be checked, operation continues to step 520. Otherwise, operation jumps to step 523. In step 520, a determination is made whether the current state is the initial state. If the current state is the initial state, operation continues in step 521. Otherwise, operation jumps to step 522. In step 521, a new unchecked edge from the initial state is selected as a first edge, and operation returns to step 514. In contrast, in step 522, the new unchecked edge is selected as a new edge, and operation returns to step 516.

In step 523, a determination is made whether the current state is the initial state. If not, operation continues in step 524, where the previous current state is selected as the current state. Operation then returns to step 519. Otherwise, the current state is the initial state, and all paths have been checked. Accordingly, operation continues to step 525, where operation returns to step 530.

Figure 25:
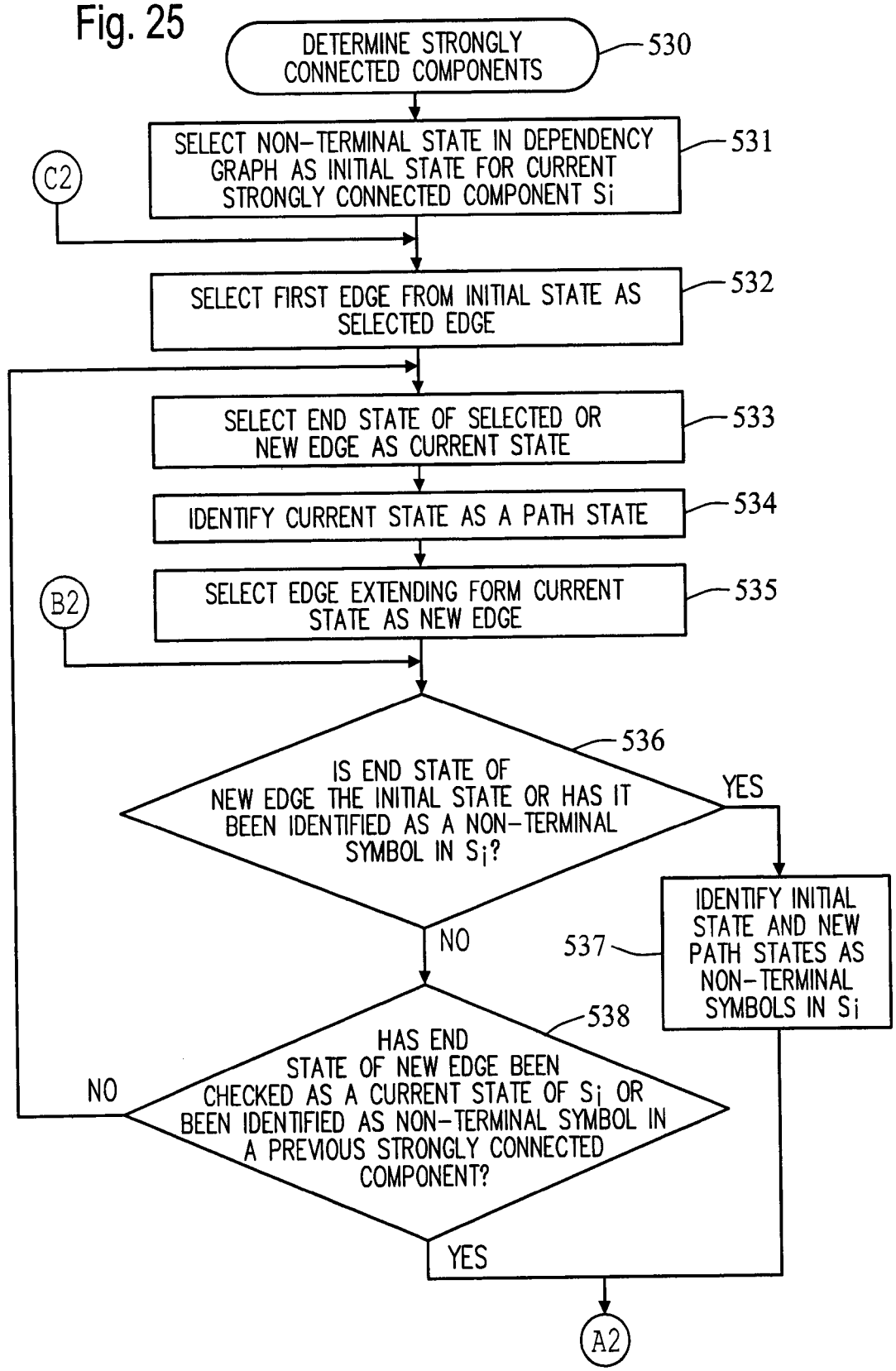
FIGS. 25 and 26 are a flowchart outlining in greater detail one exemplary embodiment of the method for determining the strongly connected components representing context-free grammars of FIG. 20 according to this invention.
Figure 26:
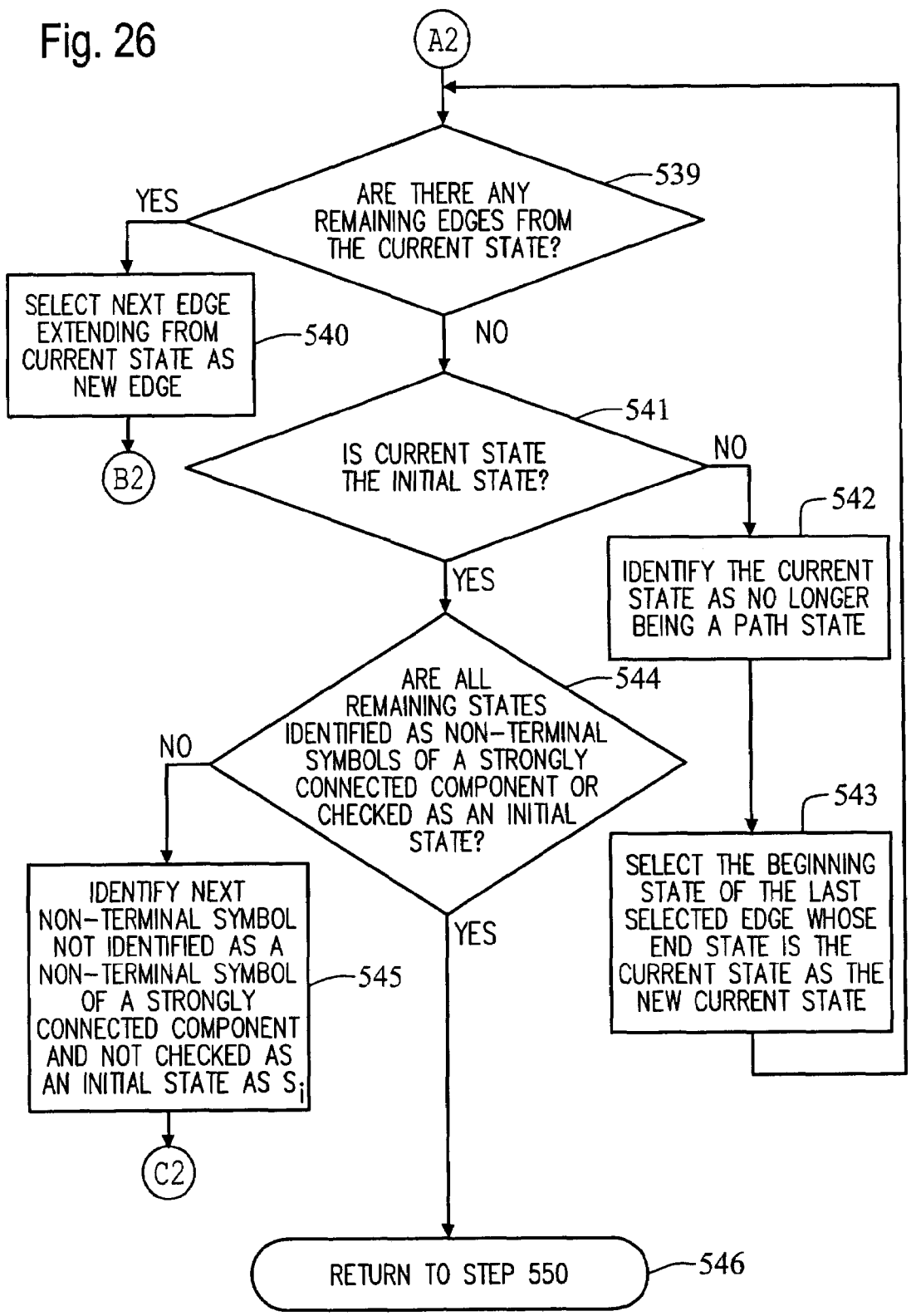
Figure 27:
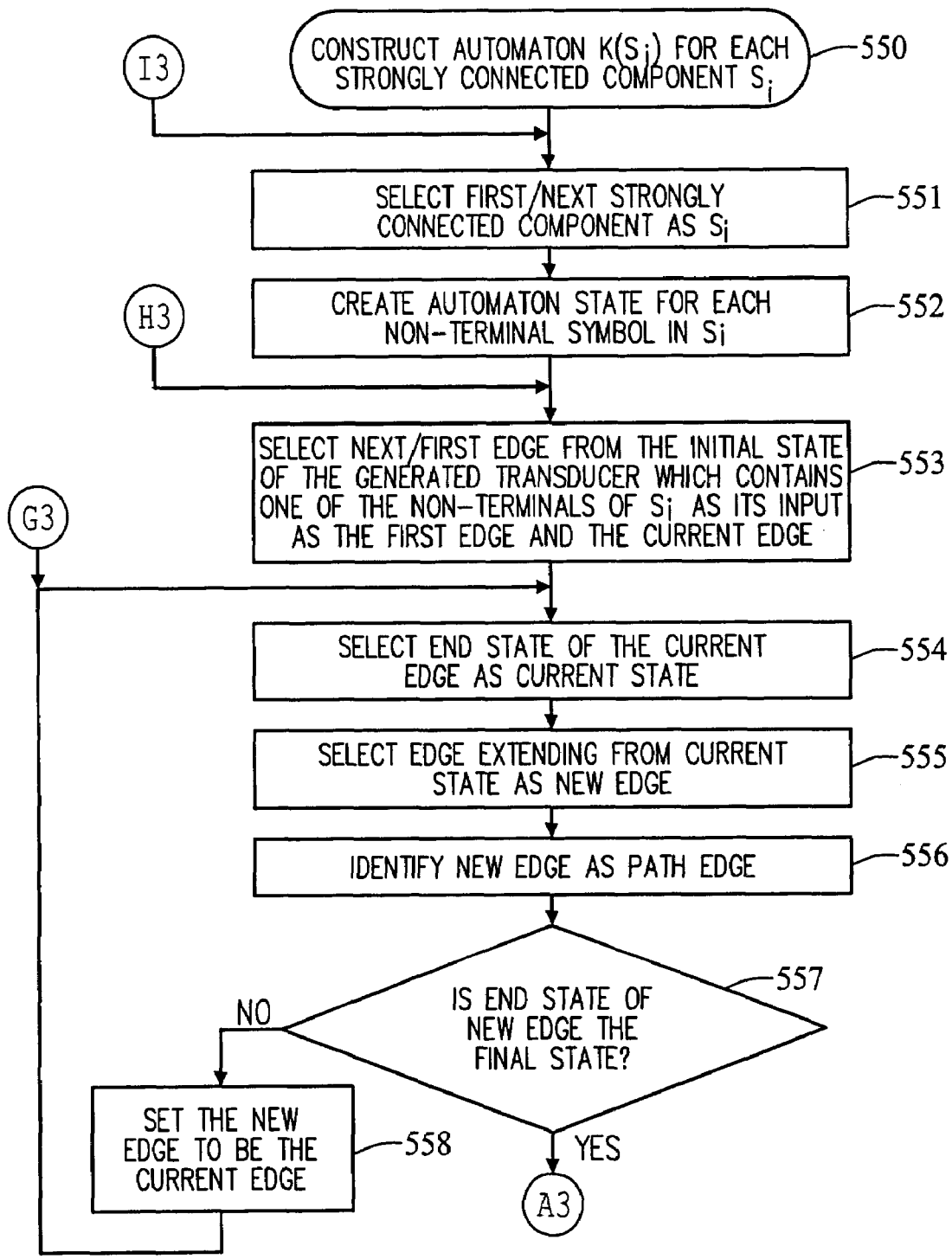
FIGS. 27-30 are a flowchart outlining in greater detail one exemplary embodiment of the method for generating a finite-state automaton representing strongly connected components of FIGS. 25 and 26 according to this invention.
Figure 28:
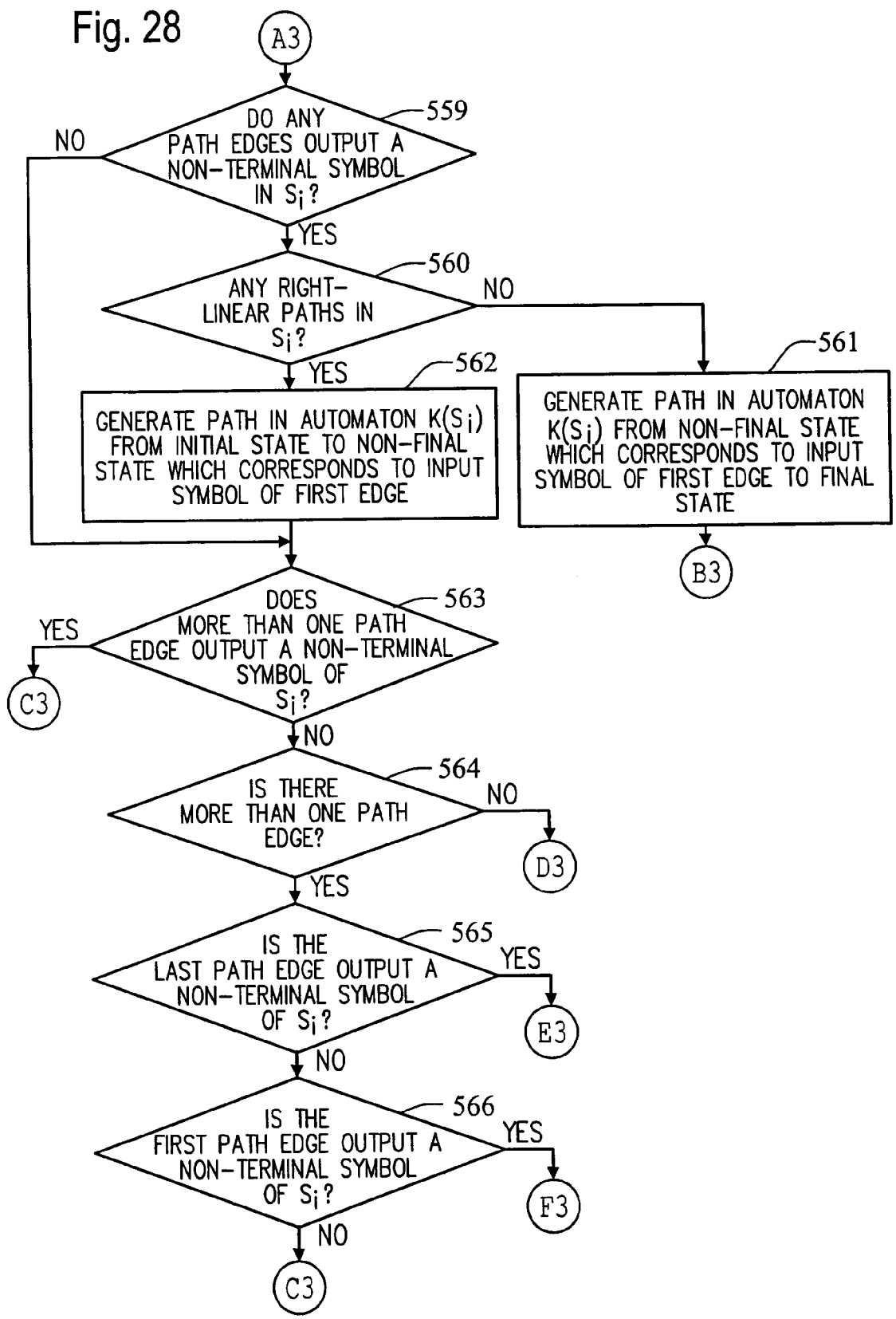
Figure 29:
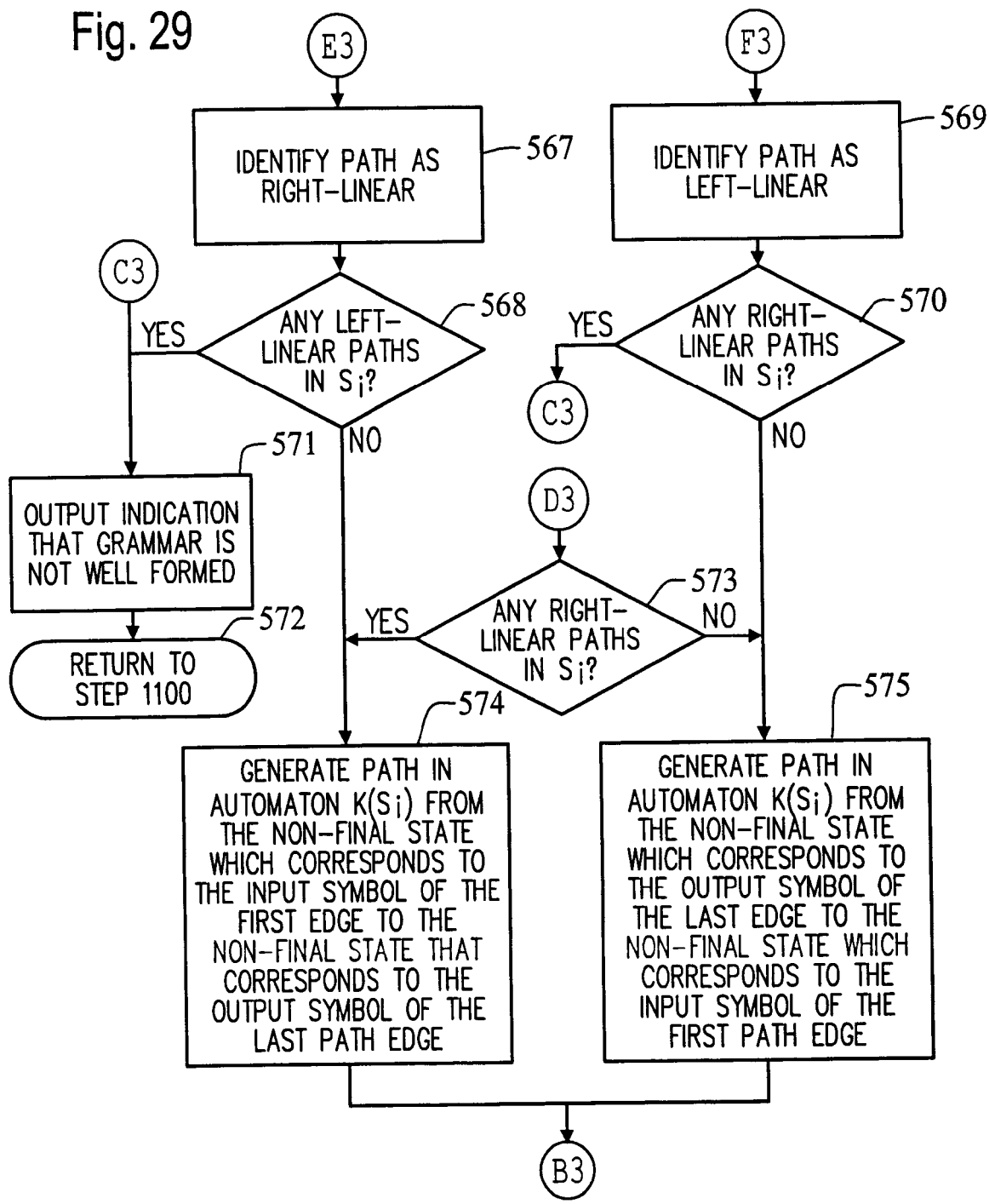
Figure 30:
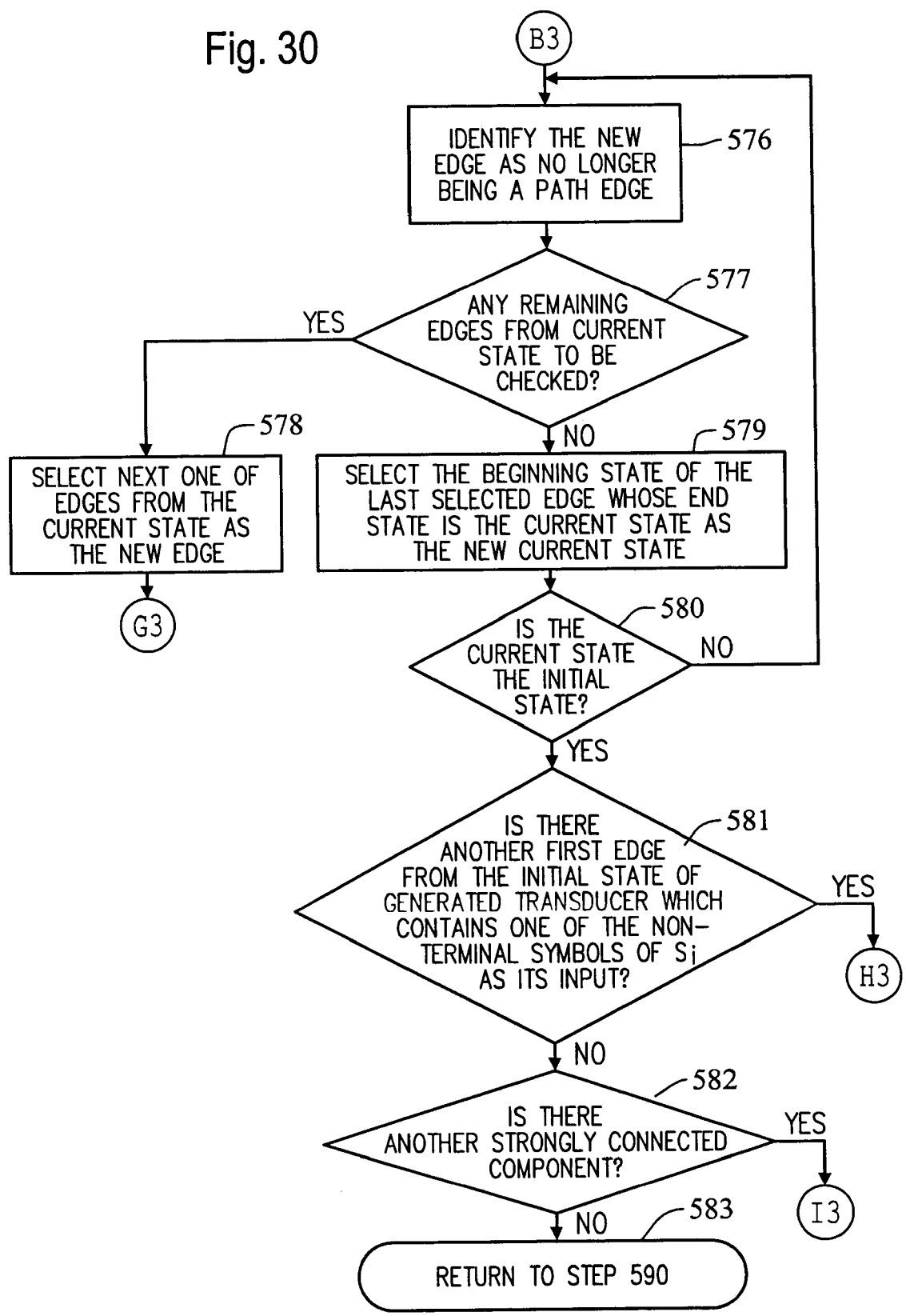

FIGS. 25 and 26 are a flowchart outlining in greater detail one exemplary embodiment of a method for determining the strongly connected components of the finite-state transducer of step 430. This is done by examining the dependency graph generated in step 510. As shown in FIGS. 25 and 26, operation of the method begins in step 530 and continues to step 531, where a state in the dependency graph is selected as the initial state for the current strongly connected component $S_i$. Then, in step 532, a first edge from the initial state of the dependency graph is selected. Next, in step 533, the end state of the edge is selected as the current state. Operation then continues to step 534.

In step 534, the current state is identified as a path state, meaning it is a possible non-terminal symbol in $S_i$. Next, in step 535, an edge extending from the current state is selected as a new edge. Then, in step 536, a determination is made whether the end state of the new edge is the initial state or has already been identified as a non-terminal symbol in $S_i$. If so, a closed path has been identified and operation continues to step 537. Otherwise, operation jumps to step 538.

In step 537, the initial state and the new path states are identified as non-terminal symbols in $S_i$. Operation then jumps to step 539. In contrast, in step 538, a determination is made whether the end state of the new edge has been checked as a current state of $S_i$ or been identified as a non-terminal symbol of a previously identified strongly connected component. If neither is the case, operation returns to step 533. Otherwise, operation again continues to step 539.

In step 539, a determination is made whether there are any more remaining edges from the current state to be checked. If so, operation continues to step 540. Otherwise, operation jumps to step 541. In step 540, the next edge extending from the current state is selected as the new edge. Operation then returns to step 536. In contrast, in step 541, a determination is made whether the current state is the initial state. If not, operation continues to step 542. Otherwise, operation jumps to step 544. In step 542, the current state is identified as not being a possible non-terminal symbol in $S_i$ and it is no longer identified as a path state. Then, in step 543, the immediately previous current state again is selected as the current state. Operation then returns to step 539.

In contrast, in step 544, a determination is made whether all the other states in the dependency graph have been checked as initial states or been identified as a non-terminal symbol of a strongly connected component. If not, operation continues in step 545, where a non-terminal symbol which has not been checked as an initial state or been identified as a non-terminal symbol of a strongly connected component is selected as the initial state. Operation then returns to step 532. Otherwise, operation jumps to step 546, where operation returns to step 550.

FIGS. 27-30 are a flowchart outlining in greater detail one exemplary embodiment of a method for constructing a finite-state automata K(S) representing each strongly connected component of step 550. As shown in FIGS. 27-30, operation of the method begins in step 550 and continues to step 551, where a first or next strongly connected component $S_i$ is selected. Next, in step 552, a finite-state automaton state is created for each non-terminal symbol in the selected strongly connected component $S_i$. Then, in step 553, a first or next edge that is labeled with one of the non-terminal symbols in the selected strongly connected component $S_i$, and which extends from the initial state of the input finite-state transducer used in step 430, is selected as the first edge and as the current edge. Next, in step 554, the end state of the current edge is selected as the current state. Operation then continues to step 555.

In step 555, an edge extending from the current state is selected as the new edge. Then, in step 556, the new edge is identified as a path edge. Next, in step 557, a determination is made whether the end state of the new edge is the final state. If so, a completed path has been identified and operation jumps to step 559. Otherwise, operation continues to step 558, where the new edge becomes the new current edge. Operation then returns to step 554.

In step 559, a determination is made whether any path edges have output labels that are non-terminal symbols in the selected strongly connected component $S_i$. If not, the path is either right- or left-linear. Accordingly, operation continues to step 560. Otherwise, operation jumps to step 563.

In step 560, a determination is made whether any previous paths in the current strongly connected component $S_i$ were found to be right-linear. If so, the selected strongly connected component $S_i$ is right-linear. Thus, operation continues to step 561. Otherwise, the selected strongly connected component $S_i$ is left-linear and operation jumps to step 562. In step 561, a path is generated in the finite-state automaton $K(S_i)$ from the non-terminal state that corresponds to the input symbol on the first edge to the final state of $K(S_i)$. This path in the finite-state automaton $K(S_i)$ should contain an edge for any path edge that is not labeled with a non-terminal symbol of the selected strongly connected component $S_i$. New states are created between the edges as required. Operation then jumps to step 575.

In contrast, in step 561, a path is generated in the finite-state automaton $K(S_i)$ from the initial state of $K(S_i)$ to the non-final state that corresponds to the input symbol on the first edge. This path in the finite-state automaton $K(S_i)$ should contain an edge for each path edge that is not labeled with a non-terminal symbol of the selected strongly connected component $S_i$. New states are created between the edges as required. Operation then jumps to step 576.

It should be appreciated that, in step 560, a path may be able to be treated as both (i.e., either) right- or left-linear. Thus, if step 560 is reached before another path in the selected strongly connected component $S_i$ has been identified as right-linear or left-linear, then the path edge information for this path should be saved. In this case, step 560 and one of steps 561 or 562 are then executed for this path only after the selected strongly connected component $S_i$ is determined to be right-linear or left-linear.

In step 563, a determination is made whether there is more than one path edge that has an output that is a non-terminal symbol of the selected strongly connected component $S_i$. If so, the path is not well formed. Accordingly, operation jumps to step 571. Otherwise, operation continues to step 564, where a determination is made whether there is more than one path edge. If there is more than one path edge, the path must be either right- or left-linear. Accordingly, operation jumps to step 573. Otherwise, operation continues to step 565.

In step 565, a determination is made whether the last-determined path edge is labeled with a non-terminal symbol of the selected strongly connected component $S_i$. If so, the path is right-linear. Accordingly, operation jumps to step 567. Otherwise, operation continues to step 566. In step 566, a determination is made whether the first-determined path edge has an output that is a non-terminal symbol in the selected strongly connected component $S_i$. If so, the path is left-linear. Accordingly, operation jumps to step 569. Otherwise, the grammar is not well formed and operation again jumps to step 571.

In step 567, the path is identified as right-linear. Then, in step 568, a determination is made whether any previous paths in the current strongly connected component $S_i$ were determined to be left-linear. If so, the grammar is not well formed, and operation once again jumps to step 571. Otherwise, operation jumps to step 574.

In contrast, in step 569, the path is identified as left-linear. Next, in step 570, a determination is made whether any previous paths in the current strongly connected component $S_i$ were determined to be right-linear. If not, the grammar is well formed and operation jumps to step 575. Otherwise, the grammar is once again not well formed and operation continues to step 571. In step 571, an output indication that the grammar is not well formed is generated. Operation then continues to step 572, where operation of the method returns to step 1100.

In step 573, a determination is made whether any previous paths checked were right-linear. If so, the selected strongly connected component $S_i$ is right-linear. Accordingly, operation continues to step 574. Otherwise, the selected strongly connected component $S_i$ is left-linear, and operation continues to step 575. It should be appreciated that, in step 573, a path can be treated as either right- or left-linear. Thus, if step 573 is reached before another path in the selected strongly connected component $S_i$ has been identified as right-linear or left-linear, then the path edge information for this path should be saved. Step 573 and one of the steps 574 or 575 are then executed for this path only after the selected strongly connected component $S_i$ is determined to be right-linear or left-linear.

In step 574, a path is generated in the finite-state automaton $K(S_i)$ from the non-terminal state that corresponds to the input symbol of the first edge to the non-terminal state that corresponds to the output symbol of the last path edge. This path in the finite-state automaton $K(S_i)$ should contain an edge for each path edge that is not labeled with a non-terminal symbol of the selected strongly connected component $S_i$. New states are created between the edges as required. Operation then jumps to step 576.

In step 575, a path is generated in the finite-state automaton $K(S_i)$ from the non-terminal state that corresponds to the output label of the last path edge to the non-terminal state that corresponds to the input label of the first edge. This path in the finite-state automaton $K(S_i)$ should contain an edge for each path edge that is not labeled with a non-terminal symbol of the selected strongly connected component $S_i$. New states are created between the edges as required. Operation then continues to step 576.

In step 576, the current new edge is the last edge of the path, and thus is removed as a path edge. Next, in step 577, a determination is made whether there are any more remaining edges from the current state to be checked. If so, operation continues to step 578. Otherwise, operation jumps to step 79. In step 578, the next edge extending from the current state is selected as the new edge. Operation then returns to step 554.

In contrast, in step 579, the beginning state of the last selected edge whose end state is the current state is selected as the new current state. Then, in step 570, a determination is made whether the current state is the initial state. If not, operation returns to step 576. Otherwise, operation continues to step 581. In step 581, a determination is made whether there is another first edge from the initial state of the input finite-state transducer that has one of the non-terminal symbols of the selected strongly connected component $S_i$ as an input label. If so, operation returns to step 553. Otherwise, operation continues to step 582.

In step 582, a determination is made whether there is another strongly connected component that needs to have a finite-state automaton $K(S_i)$ constructed for it. If so, operation returns to step 551. Otherwise, operation continues to step 583, where operation returns to step 590.

Figure 31:
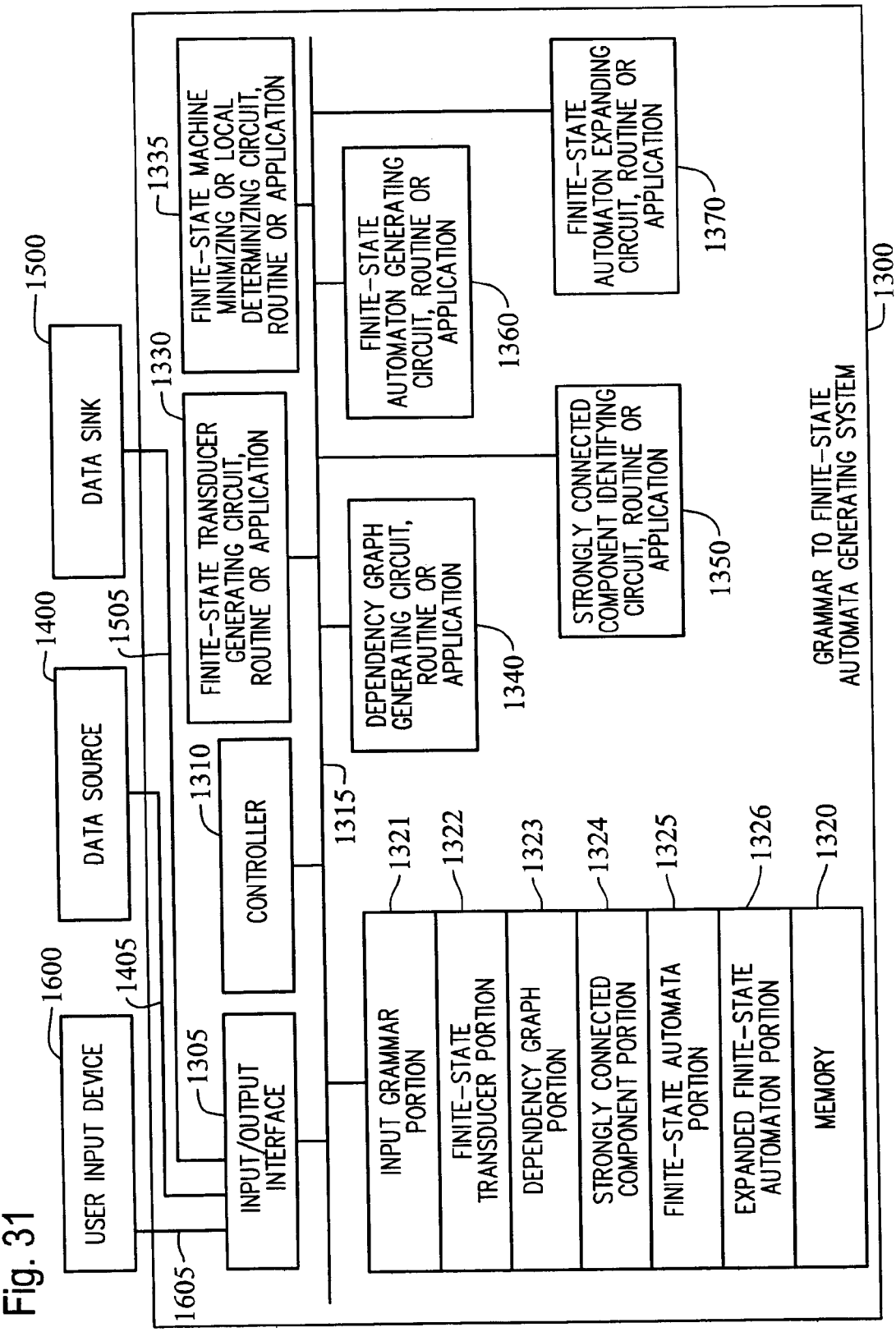
FIG. 31 is a block diagram outlining one exemplary embodiment of a grammar to finite-state automata generating system according to this invention.

FIG. 31 shows one exemplary embodiment of a grammar to finite-state automata generating system 1300 usable to generate weighted finite-state automata representing grammars according to this invention. As shown in FIG. 31, the grammar transformation system 1300 includes an input/output interface 1305, a controller 1310, a memory 1320, a finite state transducer generating circuit, routine or application 1330, a finite-state minimizing or local determinizing circuit, routine or application 1335, a dependency graph generating circuit, routine or application 1340, a strongly connected component identifying circuit, routine or application 1350, a finite-state automaton generating circuit, routine or application 1360, and a finite-state expanding circuit, routine or application 1370, each of which is interconnected by one or more control and/or data busses and/or application program interfaces 1315.

As shown in FIG. 31, a grammar data source 1400, a finite-state automata data sink 1500 and one or more user input devices 1600 are connected to the grammar to finite-state automata generating system 1300 by links 1405, 1505 and 1605, respectively.

In general, the grammar data source 1400 and the finite-state automata data sink 1500 can be any one of a number of different devices, such as a general purpose computer, or a device suitable for storing and/or transmitting grammar data, such as a client or server of a network or the internet, or the World Wide Web. For example, the grammar data source 1400 or the finite-state automata data sink 1500 may be a data carrier, such as a magnetic storage disk, CD-ROM or the like, or host computer, that contains grammar data.

In general, the grammar data source 1400 and the finite-state automata data sink 1500 can be any known or later-developed device that is capable of providing grammar data to or receiving grammar data from the grammar to finite-state automata generating system 1300 of this invention, respectively. It should be appreciated that the grammar data source 1400 or the finite-state automata data sink 1500 of FIG. 31 do not need to be the same type of device.

The grammar data source 1400 or the finite-state automata data sink 1500 can be integrated with the grammar to finite-state automata generating system 1300, such as in a general-purpose computer with internal magnetic storage disk. In addition the grammar to finite-state automata generating system 1300 may be integrated with devices providing additional functions in addition to the grammar data source 1400 or the finite-state automata data sink 1500, in a larger system using grammars to process data, such as a speech recognition system.

The one or more user input devices 1600 may be any combination of one or more of a keyboard, a mouse, a joy stick, a trackball, a touch pad, a touch screen, a pen-based system, a microphone and associated voice recognition software, or any other known or later-developed device for inputting user commands and/or data to the grammar to finite-state automata generating system 1300.

Each of the links 1405, 1505 and 1605 connecting the grammar data source 1400, the finite-state automata data sink 1500, and one or more of the input device(s) 1600, respectively, to the grammar to finite-state automata generating system 1300 can be a direct cable connection, a modem, a local area network, a wide area network, an intranet, a storage area network, an extranet, the Internet, any other distributed processing network, or any other known or later-developed connection device. It should be appreciated that any of these connections may be wired or wireless. In general, each of the links 1405, 1505 and 1605 can be implemented using any known or later-developed connection system or structure usable to connect the respective devices to the grammar to finite-state automata generating system 1300. It should be understood that the links 1405, 1505 and 1605 do not need to be of the same type.

The memory 1320 can be implemented using any appropriate combination of alterable, volatile, or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

Each of the various components of the grammar to finite-state automata system 1300 can be implemented as software executing on a programmed general purpose computer, a special purpose computer, a microprocessor or the like. Alternatively, each of the various components of the grammar to finite-state automata generating system 1300 can be implemented as a routine embedded in a library, or a resource residing on a server, or the like. The grammar to finite-state automata generating system 1300 can be also be implemented by physically incorporating the grammar to finite-state automata generating system 1300 into a software and/or hardware system, such as a speech recognition system or language translation system of a computer or communication device. It should be understood that each of the various components of the grammar to finite-state automata generating system 1300 do not need to be implemented the same way.

It should also be understood that each of the circuits, routines, objects, applications or managers and components 1305-1370 shown in FIG. 31 can each be implemented as portions of a suitably programmed general-purpose computer. Alternatively, each of the circuits, routines, applications or managers shown in FIG. 31 can be implemented as physically distinct hardware circuits within an ASIC, using a digital signal processor (DSP), using a FPGA, a PLD, a PLA and/or a PAL, or using discrete logic elements or discrete circuit elements. The particular form that the various components circuits, routines, objects, applications or managers 1305-1370 shown in FIG. 31 will take is a design choice and will be obvious and predictable to those skilled in the art.

When operating the grammar to finite-state automata generating system 1300, the input grammar rules representing a non-regular grammar, in a format such as that shown in FIG. 2, are output from the grammar data source device 1400 over the link 1405. The input/output interface 1305 inputs the received grammar rules, and under the control of the controller 1310, forwards the received grammar rules either to the input grammar portion 1321 of the memory 1320 or directly to the finite-state transducer generating circuit, routine or application 1330.

Under control of the controller 1310, the finite-state transducer generating circuit, routine or application 1330 retrieves the input grammar rules from the input grammar portion 1321 or directly receives the input grammar rules. The finite-state transducer generating circuit, routine or application 1330 generates a finite-state transducer, such as that shown in FIG. 3, based on the received grammar rules. A path is generated in this finite-state transducer for each rule in the input grammar. For a given input grammar rule, an edge is created, in the finite-state transducer path that represents that rule, for each grammar symbol in that rule. The edges in a finite-state transducer path are labeled with the corresponding symbols from the input grammar rule that path represents and occur in the same sequence as the symbols appear in that rule. The finite-state transducer is then stored, under the control of the controller 1310, in the finite-state transducer portion 1322 of the memory 1320 or is directly output to the finite-state machine minimizing or local determinizing circuit, routine or application 1335.

Under control of the controller 1310, the finite-state machine minimizing or local determinizing circuit, routine or application 1335 thus retrieves the finite-state transducer from the finite-state transducer portion 1322 or directly receives the finite-state transducer. The minimizing or local determinizing circuit, routine or application 1335 minimizes the original finite-state transducer to generate a new, minimized finite-state transducer, such as that shown in FIG. 4. To generate the minimized finite-state transducer, from the original finite-state transducer, edges with similar input symbols or output symbols are combined to reduce the redundancy in the original finite-state transducer. It should be appreciated that any one or more known or later-developed methods for minimizing a finite-state machine can be used. One exemplary embodiment of a method for minimizing a finite-state machine is disclosed in greater detail in the incorporated 679 patent. The minimized finite-state transducer is then, under the control of the controller 1310, either stored in the finite-state transducer portion 1322 of the memory 1320 or output directly to the dependency graph generating circuit, routine or application 1340.

Under control of the controller 1310, the dependency graph generating circuit, routine or application 1340 thus retrieves the minimized finite-state transducer from the finite-state transducer portion 1322 or directly receives the minimized finite-state transducer. The dependency graph generating circuit, routine or application 1340 creates a dependency graph, such as that shown in FIG. 5. The dependency graph generating circuit, routine or application 1340 generates a finite-state automaton that has a state for each edge of the minimized finite-state transducer that is labeled with a non-terminal symbol. The dependency graph generating circuit, routine or application 1340 also generates an edge in the dependency graph for each edge in the minimized finite-state transducer that does not begin at the initial state of the finite-state transducer and that is labeled with a non-terminal symbol. Each edge of the dependency graph ends at a state of the dependency graph representing that non-terminal symbol and begins at the dependency graph state representing the non-terminal symbol label of the finite-state transducer edge that begins at the finite-state transducer initial state. The dependency graph is then, under the control of the controller 1320, stored in the dependency graph portion 1323 of the memory 1320 or directly output to the strongly connected component identifying circuit, routine or application 1350.

Under control of the controller 1310, the strongly connected component identifying circuit, routine or application 1350 retrieves or directly receives the dependency graph. The strongly connected component identifying circuit, routine or application 1350 identifies the strongly connected components of the input grammar based on the dependency graph. The strongly connected component identifying circuit, routine or application 1350 searches the dependency graph to identify all paths of the dependency graph in which edges can be followed from a selected beginning state, through one or more other states, and back to the selected beginning state. All such paths that share at least one common state are identified as a single strongly connected component. The non-terminal symbols representing the states included in a single strongly connected components are identified as the non-terminal symbols of that strongly connected component. The strongly connected components and their non-terminal symbols are then stored in the strongly connected component portion 1324 of the memory 1320 under the control of the controller 1310.

Under control of the controller 1310, the finite-state automaton generating circuit, routine or application 1360 then retrieves the finite-state transducer from the finite-state transducer portion 1322 of the memory 1320 and the non-terminal symbols of a strongly connected component either from the strongly connected component portion 1324 of the memory 1320 or directly from the strongly connected component identifying circuit, routine or application 1350. The finite-state automaton generating circuit, routine or application 1360 then generates, for each strongly connected component, a finite-state automaton that contains the paths of the minimized finite-state transducer that define the mutually dependent relationships of that strongly connected component. The finite-state automaton generating circuit, routine or application 1360 generates a state for each non-terminal symbol in that strongly connected component. The finite-state automaton generating circuit, routine or application 1360 incorporates paths from the input finite-state transducer into the finite-state automaton by adding an edge for each terminal symbol and for each non-terminal symbol that is not a member of that strongly connected component. The generated finite-state automata are then, under the control of the controller 1310, stored in the finite-state automata portion 1325 of the memory 1320 or, in various exemplary embodiments, are output directly or indirectly to the finite-state automata data sink device 1500 over the link 1505.

Under the control of the controller 1310, the finite-state automaton expanding circuit, routine or application 1370 receives a topology that has been input by a user using one or more of the one or more user input devices 1600 or has been automatically generated based on a task to be completed using the generated finite-state automata stored in the finite-state automata portion 1325. The finite-state automaton expanding circuit, routine or application 1370 generates a simple automaton that accepts the input topology. In various exemplary embodiments, where the single automaton is fully expanded before it is used, the finite-state automaton expanding circuit, routine or application 1370 expands each edge of the single automaton, or an intermediate automaton generated by the finite-state automaton expanding circuit, routine or application 1370, by replacing that edge, and its beginning and end states, with a corresponding one of the finite state automata generated by the finite-state automaton generating circuit, routine or application 1360 and stored in the finite-state automata portion 1325. The finite-state automaton expanding circuit, routine or application 1370 continues expanding the edges of the intermediate automaton until all edges labeled with non-terminal symbols that can be expanded have been expanded.

In contrast, in various other exemplary embodiments, the finite-state automaton expanding circuit, routine or application 1370 is used to dynamically expand the simple automaton as the simple automaton is used to recognize a sequence or string of input non-terminal symbols of the grammar. In this case, based on the grammar symbols received, the finite-state automaton expanding circuit, routine or application 1370 dynamically expands a next edge in a current path of the simple automaton representing the input topology or of an automaton obtained by a previous expansion operation, if that edge needs to be expanded. If that edge does not need to be expanded, that edge is simply traversed, and the next symbol is input.

To expand an edge of the simple automaton, or of an expanded version of the simple automaton, based on an input symbol, the finite-state automaton expanding circuit, routine or application 1370 retrieves, under the control of the controller 1310, a finite-state automaton that contains the input non-terminal symbol as a state from the finite-state automata portion 1325 of the memory 1320. This finite-state automaton is then modified to make the state corresponding to the input symbol an initial state if the corresponding strongly connected component is right-linear. Alternatively, the finite-state automaton is modified to make the state corresponding to the input symbol an end state if the corresponding strongly connected component is left-linear. The modified finite-state automaton is then substituted for the edge corresponding to the input symbol to be expanded. The initial state of the modified finite-state automaton becomes the beginning state of the edge being replaced and the end state of the modified finite-state automaton becomes the end state of the edge being replaced. The expanded finite-state automaton is then, under the control of the controller 1310, stored either in the expanded finite-state automaton portion 1326 of the memory 1320 or directly output to the finite-state automata data sink 1500 over the link 1505.

It should be appreciated that the finite-state automaton expanding circuit, routine or application 1370 can be omitted. In this case, the grammar to finite-state automata generating system 1300 can be used to create the finite-state automata generated by the finite-state automaton generating circuit, routine or application 1360. It should also be appreciated that the finite-state machine minimizing or local determinizing circuit, routine or application 1335 may also be omitted. In this case, the dependency graph generating circuit, routine or application 1340 and the finite-state automaton generating circuit, routine or application 1360 use the original finite-state transducer generated by the finite state transducer generating circuit, routine or application 1330.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system that converts a context-free grammar to a finite-state automaton representing the context-free grammar, the context-free grammar having non-terminal symbols and terminal symbols and having a set of rules, the system comprising:
   a module that generates a first finite-state automaton from the set of rules;
   a module that generates, from the first finite-state automaton, at least one second finite-state automaton, each second finite state automaton defining a delayed acceptor for a plurality of the non-terminal symbols of the context free grammar;
   a module that receives a topology that defines an application of the context-free grammar;
   a module that generates a third finite-state automaton that represents the received topology; and
   a module that expands the third finite-state automaton based on at least one of the at least one generated second finite-state automaton.

2. The system of claim 1, wherein the received topology defines at least one condition under which the context-free grammar is to be applied to an input string of symbols of the grammar.

3. The system of claim 1, wherein the input topology identifies at least one constraint on the context-free grammar.

4. The system of claim 3, wherein the at least one constraint defines at least one initial condition on the grammar under which the context-free grammar is to be applied to an input string of symbols of the grammar.

5. The system of claim 1, wherein the module that generates the third finite-state automaton further:
   defines at least one initial state based on the topology;
   defines at least one final state based on the topology; and
   defines a plurality of edges representing the active non-terminal symbols based on the topology, each edge labeled with one of the active non-terminal symbols and extending from at least one of an initial state and a final state of the third finite-state automaton.

6. The system of claim 5, wherein each edge extends between one of the at least one initial state and one of the at least one final state.

7. The system of claim 5, wherein the module that expands the third finite-state automaton based on at least one of the at least one generated second finite-state automaton further replaces, for each of the plurality of edges of the third finite-state automaton, that edge with one of the at least one second finite-state automaton based on the non-terminal symbol with which that edge is labeled.

8. The system of claim 7, wherein the module that expands the third finite-state automaton based on at least one of the at least one generated second finite-state automaton further repeats the replacing step for each edge of the expanded third finite-state automaton that is labeled with a non-terminal symbol of the grammar.

9. The system of claim 7, wherein the module that replaces one of the plurality of edges with the one of the at least one second finite-state automaton based on the non-terminal symbol with which that edge is labeled further:
   modifies that second finite-state automaton into a new automaton that accepts the non-terminal symbol with which that edge is labeled; and
   substitutes that edge with the new automaton.

10. The system of claim 9, wherein the module that modifies that second finite-state automaton into a new automaton that accepts the non-terminal with which that edge is labeled further modifies that second finite-state automaton into a new automaton that accepts the non-terminal with which that edge is labeled based on a current status of the third finite-state transducer.

11. The system of claim 5, wherein the module that expands the third finite-state automaton based on at least one of the at least one generated second finite-state automaton further dynamically expands the third finite-state automaton based on an input string to be recognized by the third finite-state automaton, the input string comprising a plurality of symbols of the context-free grammar.

12. The system of claim 11, wherein the module that dynamically expands the third finite-state automaton based on an input string to be recognized by the third finite-state automaton further:
   inputs the input string;

selects a symbol of the input string;

determines, based on the selected symbol, whether expanding of the third finite-state automaton is desirable; and if expanding the third finite-state automaton is desirable, replaces an edge of the third finite-state automaton that is labeled with the selected symbol with one of the at least one second finite-state automaton that contains the selected symbol.

13. The system of claim 5, wherein the module that expands the third finite-state automaton based on at least one of the at least one generated second finite-state automaton further:

selects an edge of the third finite-state automaton, the selected edge labeled with one of the non-terminal symbols of the context-free grammar;

selects one of the at least one second finite-state automaton that corresponds to the non-terminal symbol with which the selected edge is labeled;

replaces the selected edge with the selected second finite-state automaton; and repeats the selecting steps and the replacing step until no edges labeled with one of the non-terminal symbols of the grammar remain in the third finite-state automaton.

14. The system of claim 1, wherein the third finite-state automaton comprises:

at least one initial state defined by the topology;

at least one final state defined by the topology; and a plurality of edges representing the active non-terminal symbols defined by the topology, each edge labeled with one of the active non-terminal symbols and extending from at least one of an initial state of the third finite-state automaton and a final state of the third finite-state automaton.

15. The system of claim 1, wherein the module that generates the at least one second finite-state automaton further:

generates a dependency graph from the first finite-state automaton;

identifies at least one strongly connected component of the grammar based on the dependency graph; and generates, from each of the at least one identified strongly connected component, one of the at least one second finite-state automaton.

16. The system of claim 15, wherein generating the dependency graph from the first finite-state automaton comprises:

creating a dependency graph state for each non-terminal symbol of the input rules of the context-free grammar;

selecting one of the states of the first finite-state automaton;

selecting one of at least one edge extending from the selected state as a first selected edge, the first selected edge labeled with one of the non-terminal symbols and having a first end state to which it extends;

selecting one of at least one edge extending from the first end state as a second selected edge, the second selected edge labeled with one of the non-terminal symbols and having a second end state to which it extends;

determining if the second selected edge is labeled with a non-terminal symbol; and if the second selected edge is labeled with a non-terminal symbol, creating an edge in the dependency graph extending from the dependency graph state for the non-terminal symbol with which the first selected edge is labeled to the dependency graph state for the non-terminal symbol with which the second selected edge is labeled.

17. A computer readable medium storing a computer program for controlling a computing device to convert a context-free grammar to a finite state automaton representing the context-free grammar, the context-free grammar having non-terminal symbols and terminal symbols and having a set of rules, the computer program including instructions comprising:

generating a first finite-state automaton from the set of rules;

generating, from the first finite-state automaton, at least one second finite-state automaton, each second finite state automaton defining a delayed acceptor for a plurality of the non-terminal symbols of the context free grammar;

receiving a topology that defines an application of the context-free grammar;

generating a third finite-state automaton that represents the received topology; and expanding the third finite-state automaton based on at least one of the at least one generated second finite-state automaton.

18. The computer readable medium of claim 17, wherein the received topology identifies at least one constraint on the context-free grammar.

19. The computer readable medium of claim 17, wherein generating the third finite-state automaton further comprises:

defining at least one initial state based on the topology;

defining at least one final state based on the topology; and defining a plurality of edges representing the active non-terminal symbols based on the topology, each edge labeled with one of the active non-terminal symbols and extending from at least one of an initial state and a final state of the third finite-state automaton.

20. The computer readable medium of claim 17, wherein the third finite-state automaton comprises:

at least one initial state defined by the topology;

at least one final state defined by the topology; and a plurality of edges representing the active non-terminal symbols defined by the topology, each edge labeled with one of the active non-terminal symbols and extending from at least one of an initial state of the third finite-state automaton and a final state of the third finite-state automaton.

21. The computer readable medium of claim 17, wherein generating the at least one second finite-state automaton comprises:

generating a dependency graph from the first finite-state automaton;

identifying at least one strongly connected component of the grammar based on the dependency graph; and generating, from each of the at least one identified strongly connected component, one of the at least one second finite-state automaton.

* * * * *